Sept. 5, 1967   D. W. GARNETT   3,339,651
WEIGHING APPARATUS

Filed Nov. 6, 1964   13 Sheets-Sheet 1

INVENTOR.
DONALD W. GARNETT
BY *Whittemore, Hulbert*
*Belknap*
ATTORNEYS

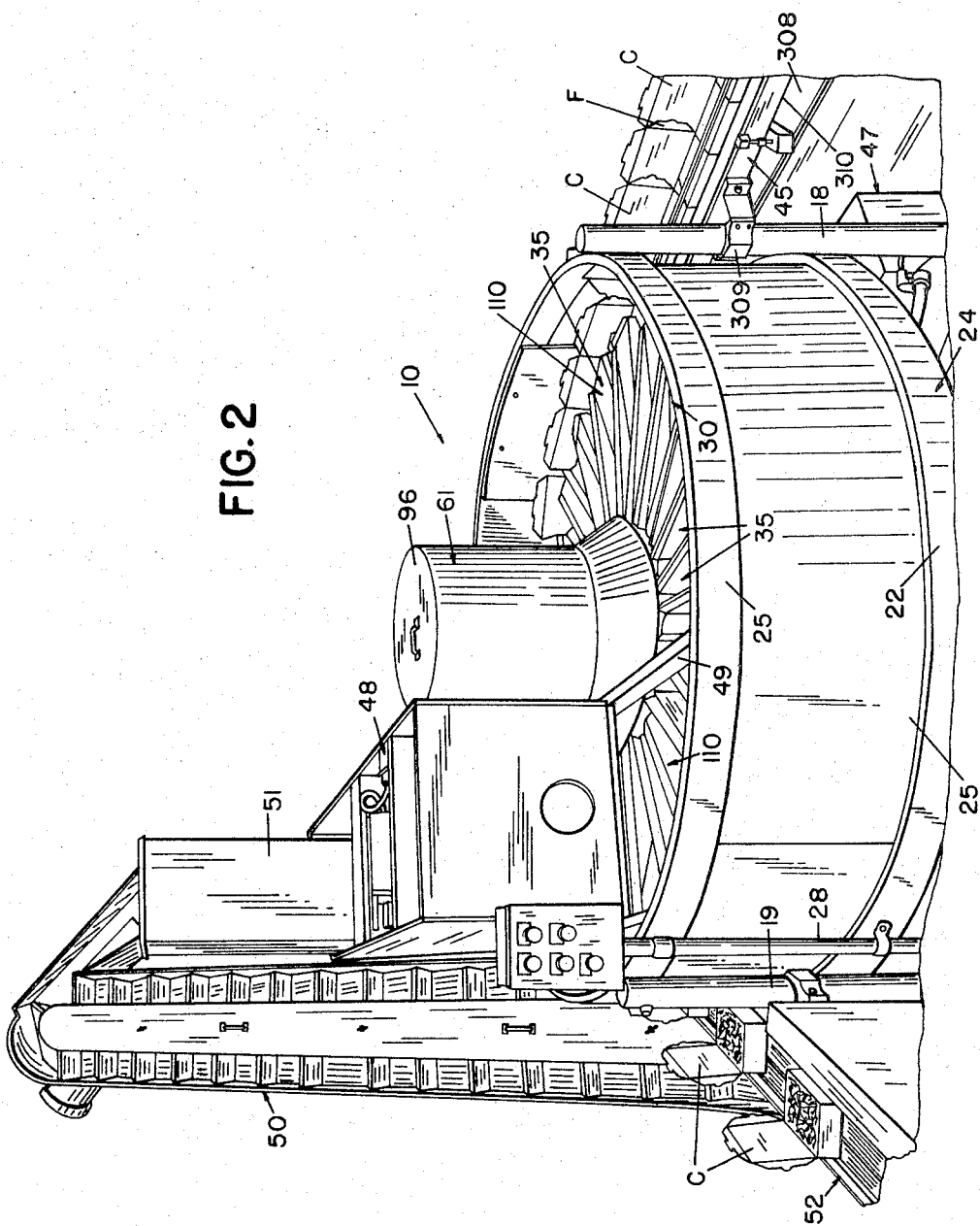

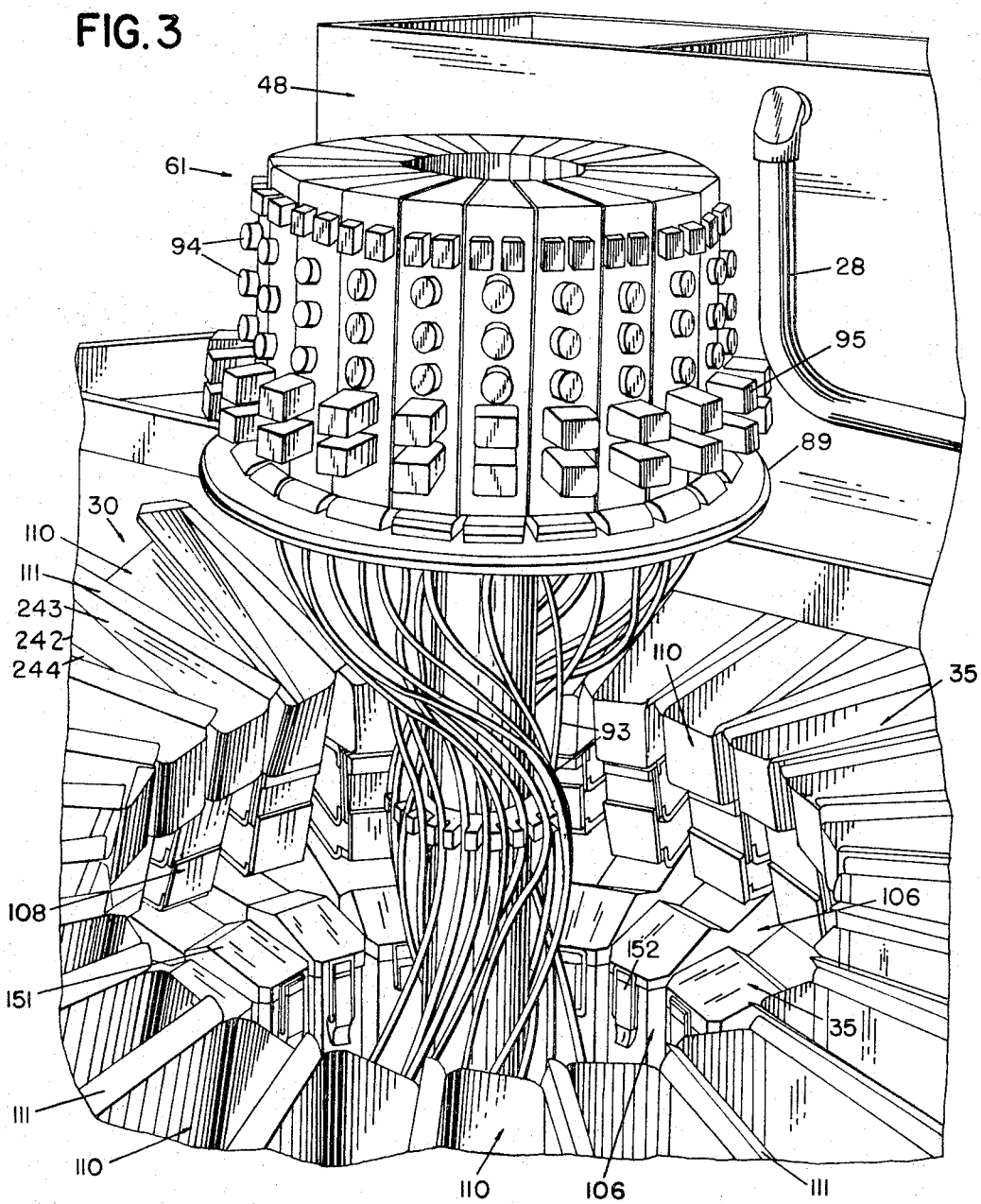

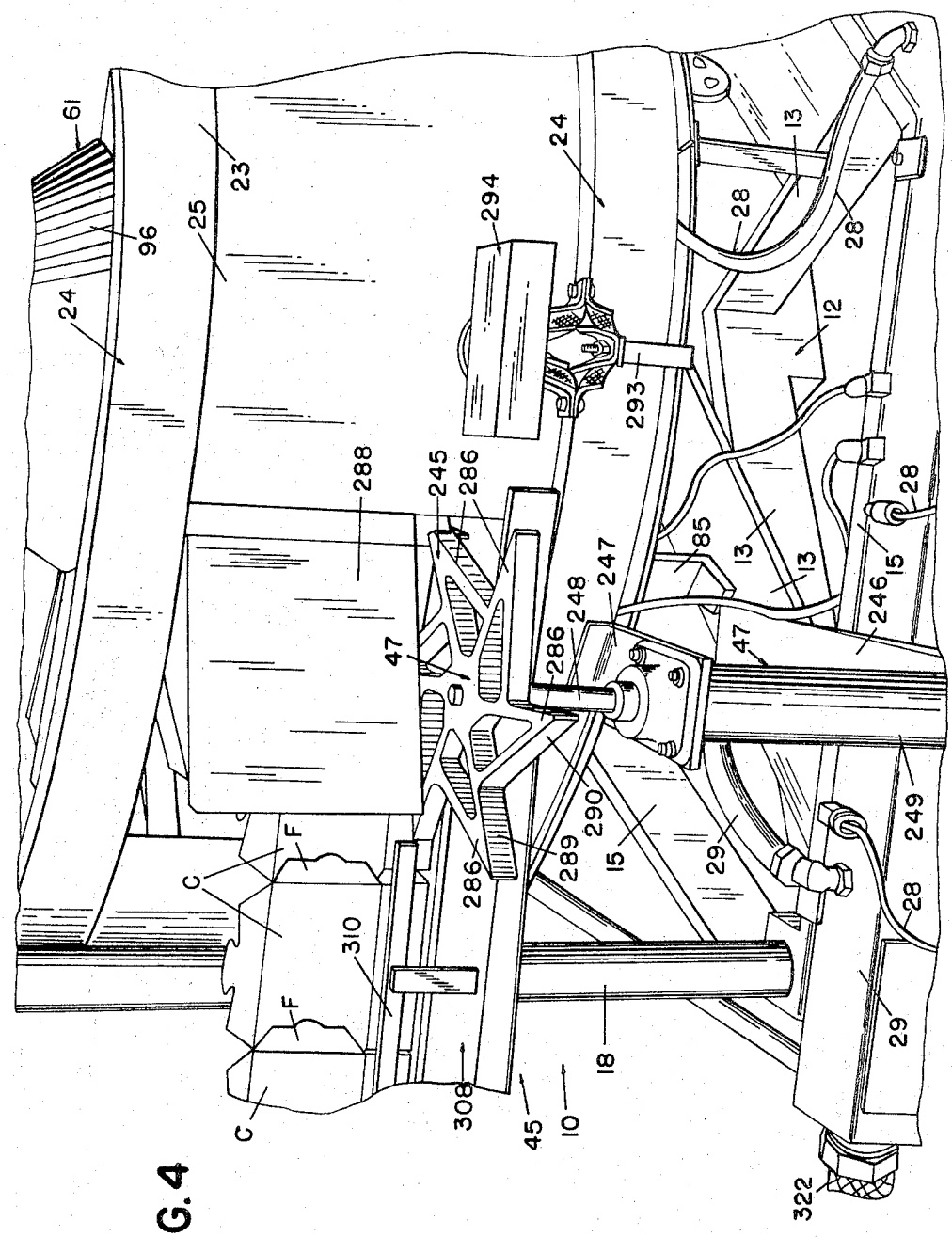

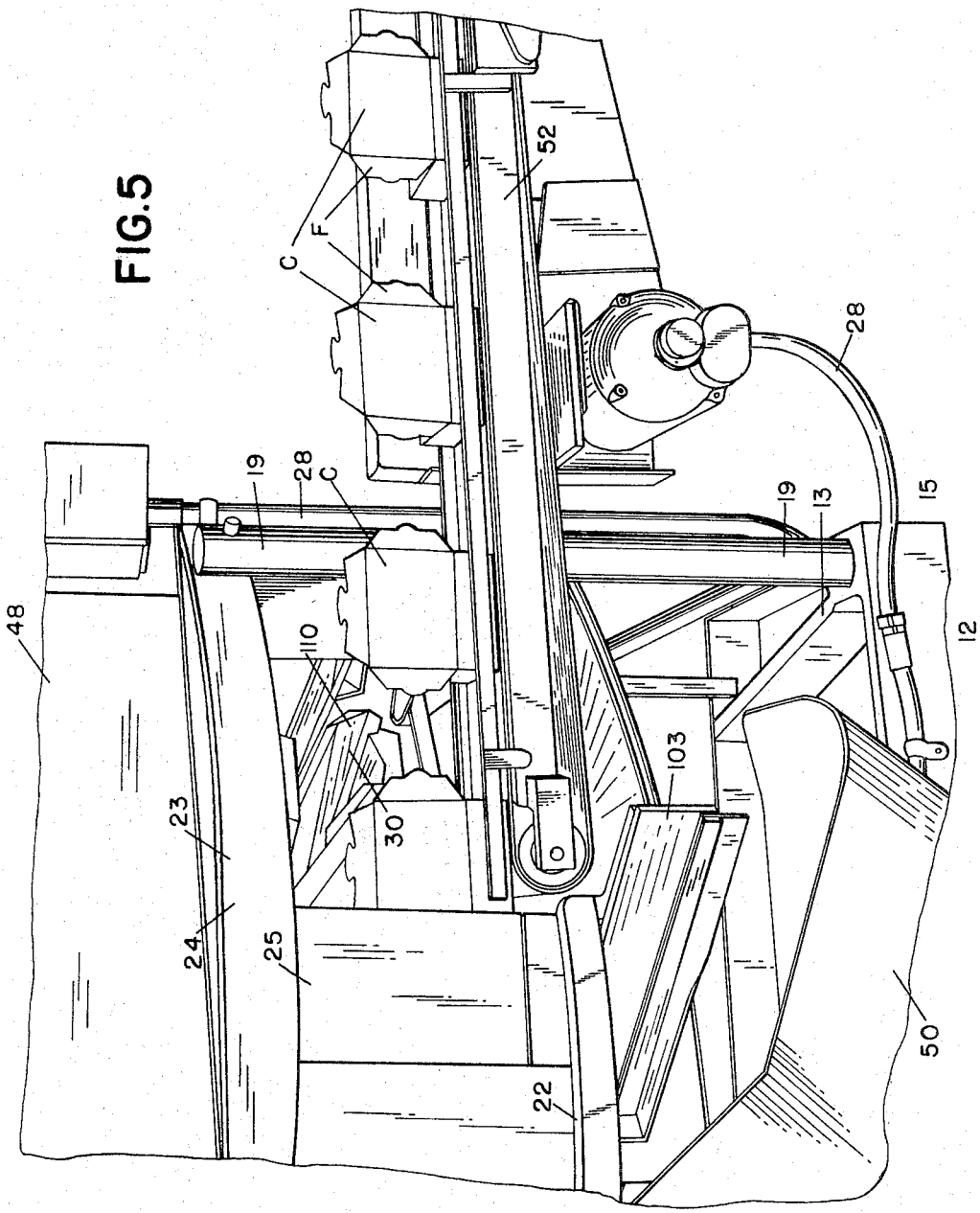

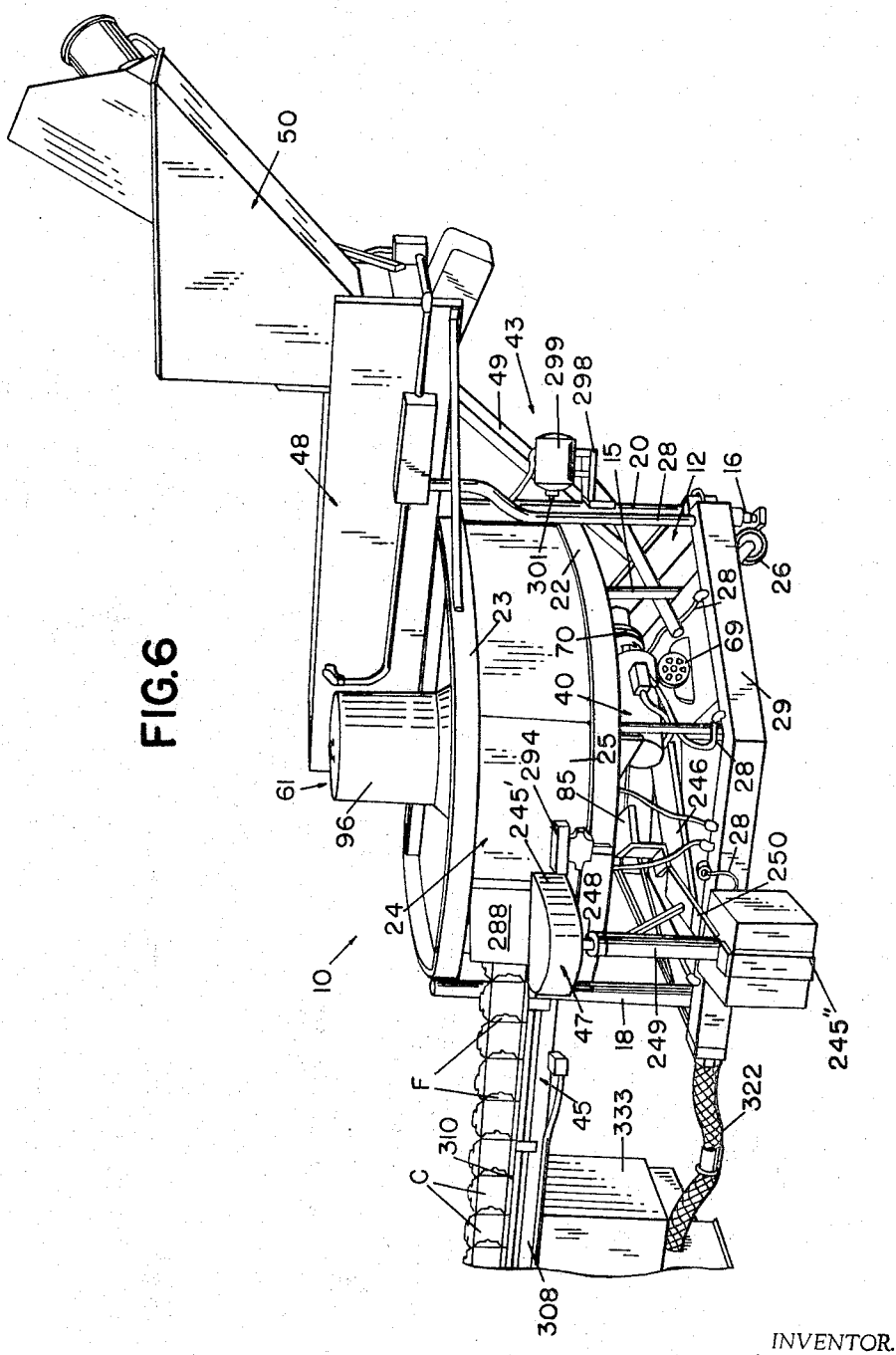

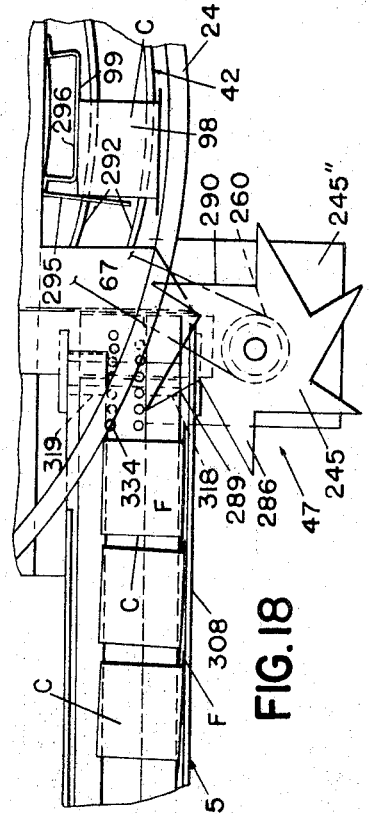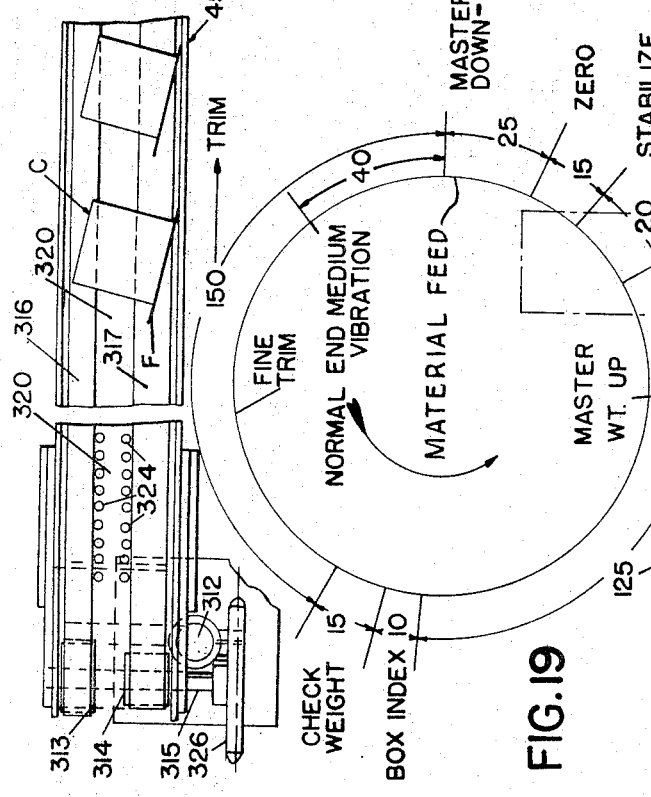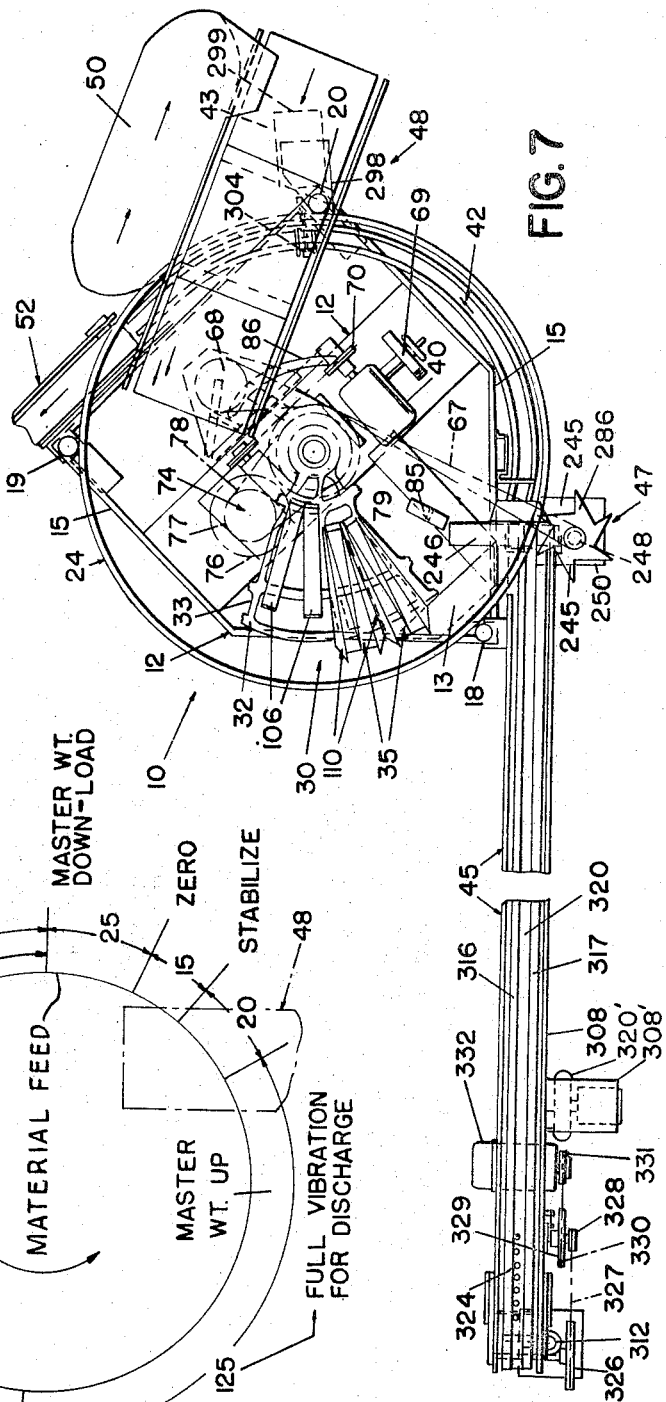

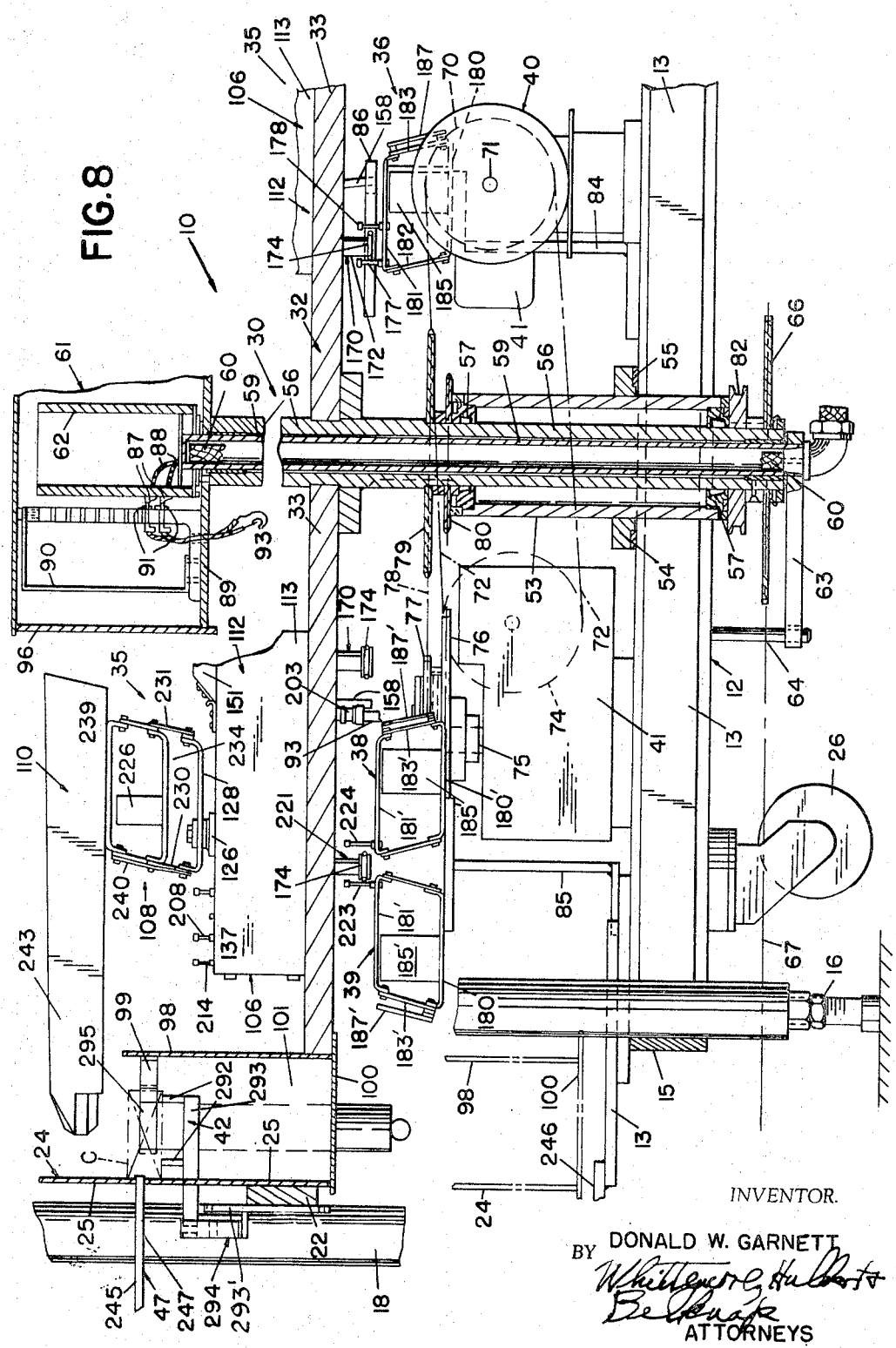

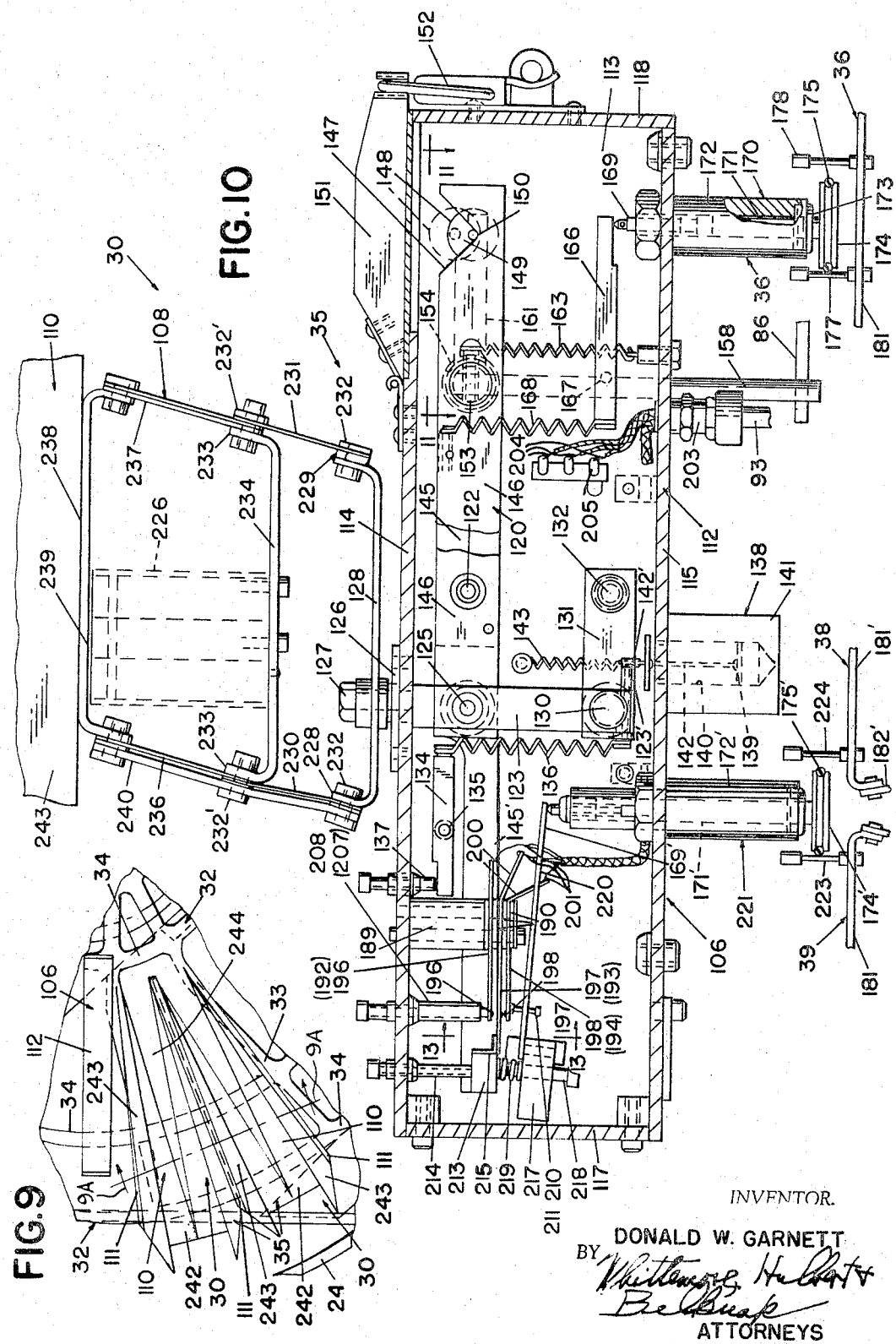

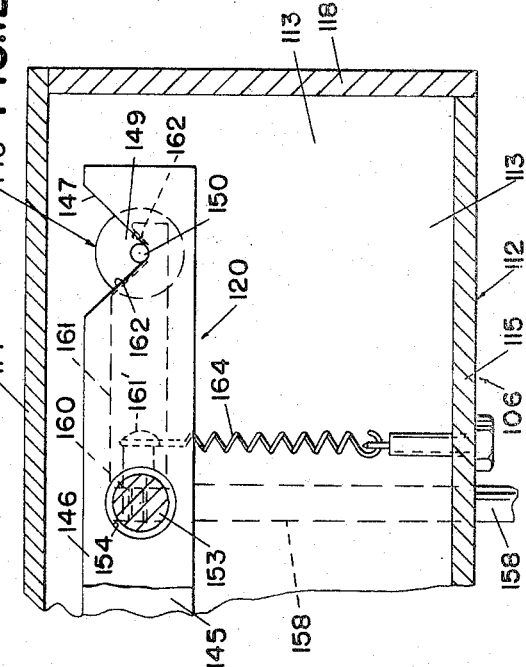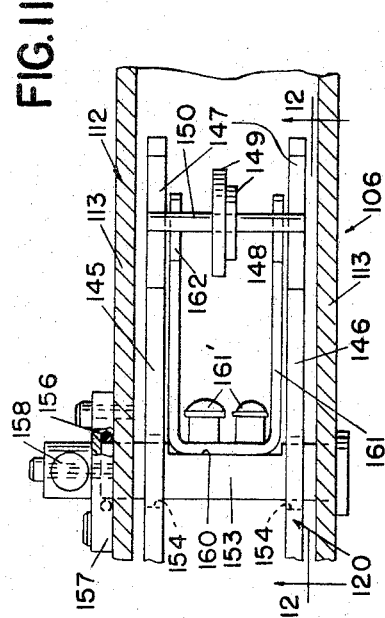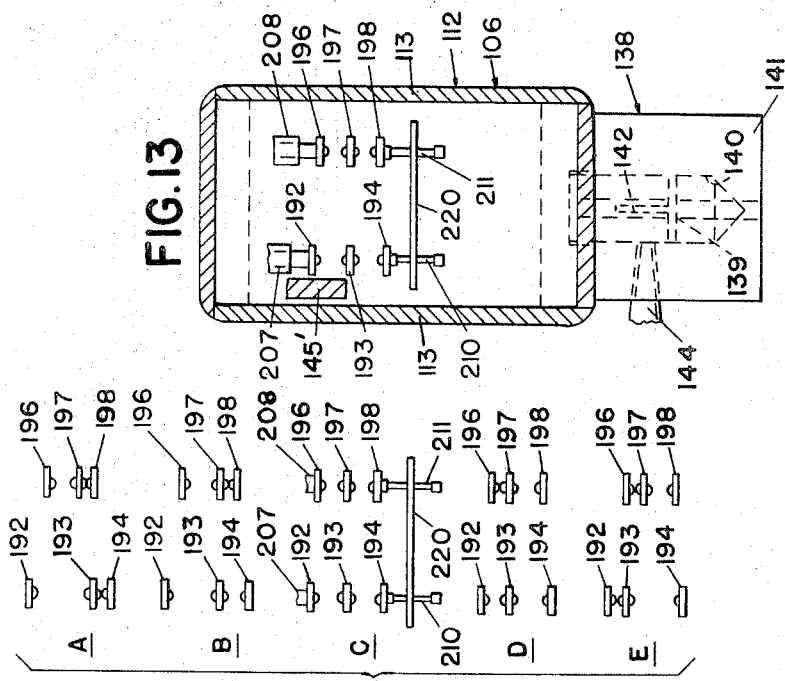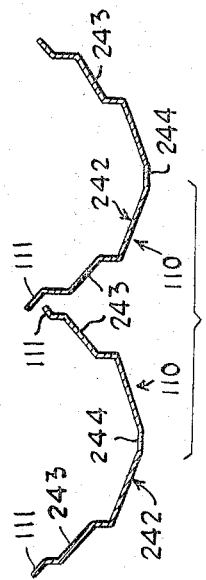

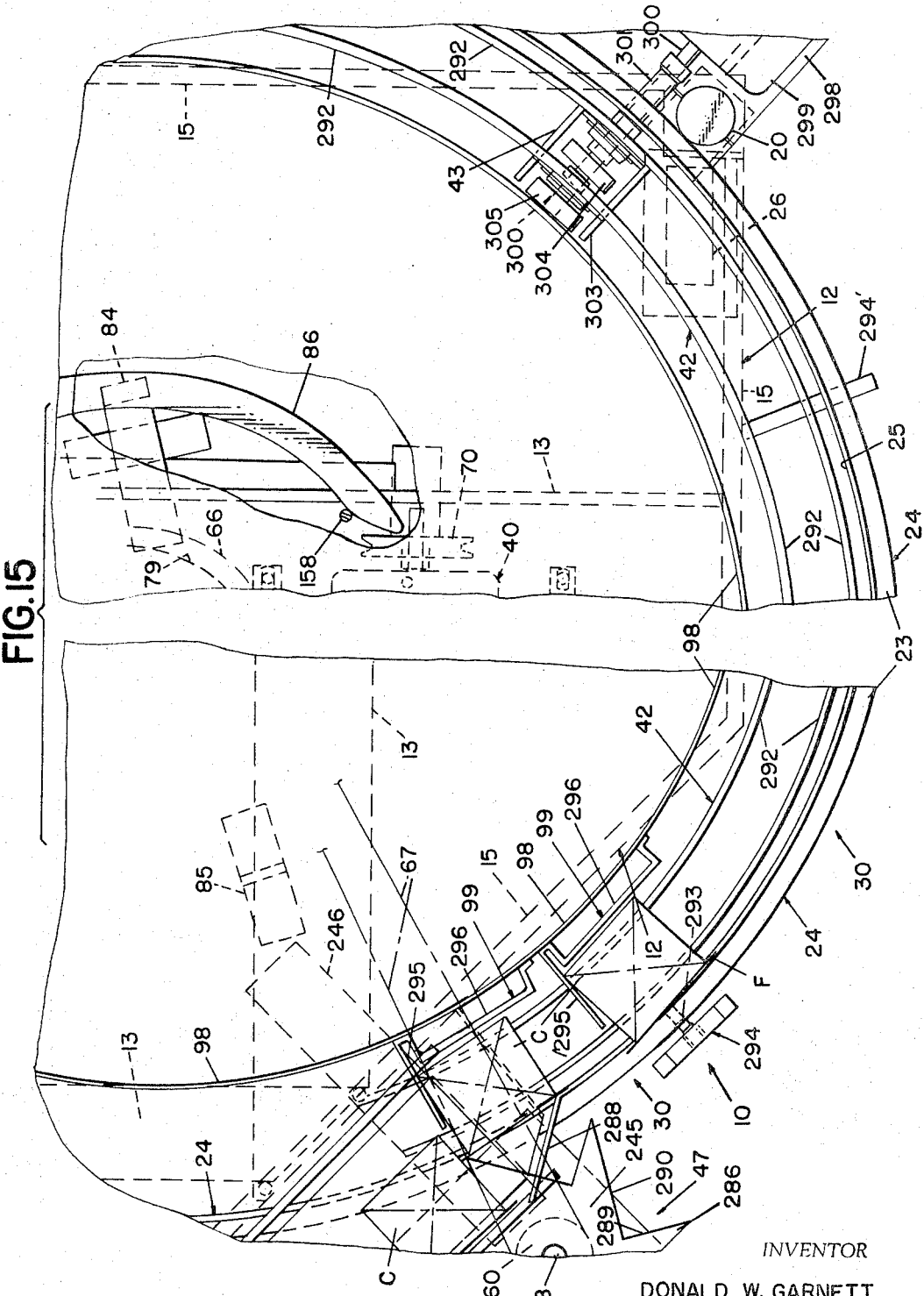

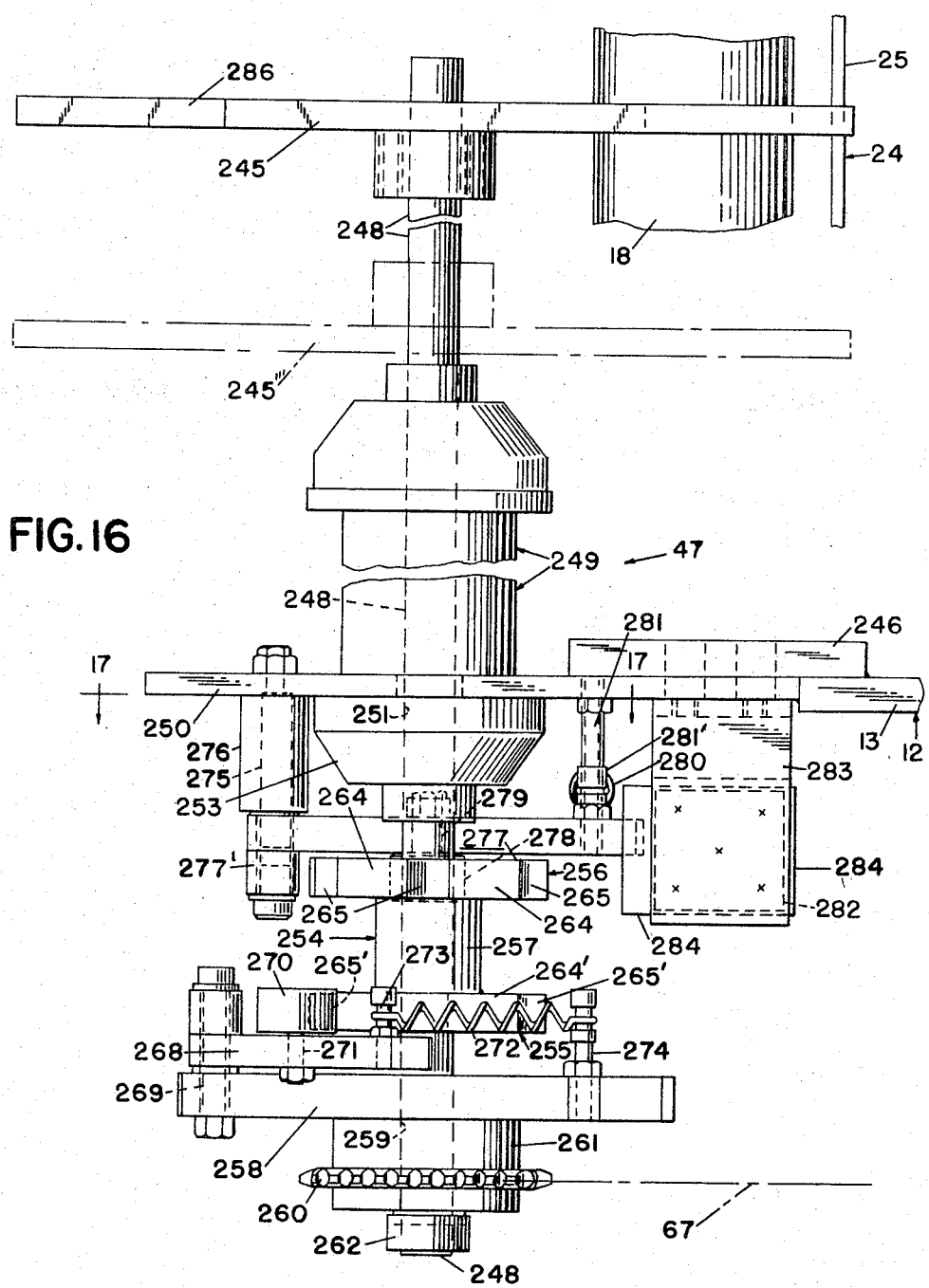

Sept. 5, 1967  D. W. GARNETT  3,339,651
WEIGHING APPARATUS

Filed Nov. 6, 1964  13 Sheets-Sheet 13

INVENTOR.
DONALD W. GARNETT
BY
ATTORNEYS 3,339,651
WEIGHING APPARATUS
Donald W. Garnett, Grand Ledge, Mich., assignor to
The Olofsson Corporation
Filed Nov. 6, 1964, Ser. No. 409,503
17 Claims. (Cl. 177—55)

The present invention relates to improvements in automatic high speed weighing apparatus of the type illustrated and described in a patent of Olofsson and Garnett, No. 3,156,311, issued Nov. 10, 1964. More particularly, the invention deals with a number of substantial simplifications of the equipment of this earlier filed application which, while preserving, if not surpassing, its high speed and accuracy in weighing and boxing discrete or particulate materials, also make possible the production of the machine at greatly reduced cost.

As disclosed in common in the above copending application, the improved weigher comprises a relatively large number of vibratory weighing receptacles, from each of which an excess weight of material initially supplied thereto is dribble fed-off in each rotative weighing cycle by vibration of the receptacle, whereby it and its content are brought to an exact desired weight in transit. The operation of the earlier equipment involved a check weighing of the weighing receptacle as a phase of the cycle to determine whether a legally impermissible underweight or an economically inadvisable overweight of material was present in the receptacle, and in either case, as well as when the weight checked out acceptably, the material was discharged by bodily tilting the receptacle at a discharge station. A charge checked as being a "reject" one was not boxed, however, since the reject signal resulted in the absence of a box or carton at the discharge zone to receive the reject material. The same is true of the present machine, but the material is discharged in a structurally simpler way than by tilting the weighing receptacle bodily, as will be described.

In regard to the above-mentioned type of underweight-overweight check weigh and discharge operation, the present equipment in a general way also resembles that of our earlier application. However, in accordance with the present improvement, the weighing apparatus performs an additional goal weight adjusting or compensating phase, hereinafter referred to.

The cycle of the earlier machine also included a zeroing phase in each rotation of its weighing receptacles, at which time a master weight was lifted from a weighing scale beam supporting the receptacle in travel, whereupon a motor-activated compensation of a zeroing weight on the beam was made. This was in response to signal from certain electrical contacts on the beam, open or closed depending upon whether the weight of the receptacle itself has been increased by accretion of coating or like material on the weighed product, or to compensate for variations in certain spring or contact means of the beam as the result of change in heat, conductivity, age, or the like. Such a zeroing phase is also included in the improved weigher cycle of the present invention, but the zeroing is itself accomplished in a much simpler manner due to certain provisions to be described.

As indicated above, one of the objects of the invention is to provide improved automatic weighing equipment in which the final discharge of the weighed product, whether underweight, overweight or acceptable weight, is effected, not by a bodily tilting of the weighing receptacles at the discharge zone, or otherwise altering the receptacle, as by the use of a trap-door or the like, but by simply increasing the rate of vibration of the receptacle to dislodge its contents; and in this respect the improvement involves a valuable simplification of the equipment.

Further in accordance with the present invention, the scale beam of each of a plurality of weigher heads, each supporting a vibratory material-receiving receptacle, is provided with electrical contacts (suitably energized through commutation means) which, upon the beam's reaching a check weigh stage or phase in the rotative cycle, may originate overweight or underweight reject signals, as determined by the condition of balance of the beam at that time. Such signals are electrically forwarded and result in the operation of a star-wheel type carton control unit, and the consequent absence of a carton at the discharge zone to receive the overweight or underweight material when it issues from the weighing receptacle in the manner to be described.

However, in addition to such reject-control contacts, it is an object to provide for a very precise control of the weight of the discharged material, well within the overweight and underweight limits, and for this purpose the scale beam of the weigher head also includes certain further electrical contacts governing operation of the beam in an entirely novel respect.

That is, while it is mandatory for a legal reason that the weigher shall not box an underweight of material product (which signifies that some degree of overweight must be boxed, a precisely exact weight being impossible of attainment as a practical matter), it is also highly desirable that the extent of the overweight above the minimum shall not be excessive. It should be only at or a slight amount above a value, representing what may be termed a "low goal," which is nevertheless safely above the legal minimum weight. By the same token, it is also highly desirable that the product discharged, while being of legal weight (and below the value at which the machine will arbitrarily set up an overweight reject signal) shall nevertheless not be unduly in excess of the low goal value. Accordingly, the scale beam has other contact provisions to initiate an electrical signal reflecting a so-called "high goal" condition; and a compensating adjustment of beam contacts is in either the low goal or the high goal case made to maintain the beam contact action within desired high and low goal limits, properly above the legally permissible minimum but not unduly wasteful of product.

These considerations may at first glance appear to involve insignificant matters, but when it is borne in mind that a day's operation of the machine, in which its high speed operating weighers discharge, in each rotative cycle, even a slight overweight of material above and beyond that which is legally acceptable, the monetary loss becomes quite large, and justifies avoidance.

Furthermore, in commercial weighers now in use, for example a conventional feed-on type in which a receptacle has material or product fed onto the same as it weighs the material, it is necessary to manually adjust the scale mechanism so that it triggers at some weight lower than the actual desired weight, in contemplation that the falling material reaching the weighing receptacle will bring the product weight up to what is desired.

It is customary for an operator to monitor periodically, for example at intervals of 10 minutes, the actual package weight of a check sample or samples, and in the event of an excessive departure from desired weight, for example an excessive and wasteful overweight, to make a compensating adjustment of the scale trigger weight. This involves the services of a number of operators, in the usual installation, and still does not result in a satisfactory weight control, inasmuch as product flow variations, due to a number of causes, take place so frequently as to be incapable of satisfactory overall compensation by such occasional adjustment.

It is therefore an important object of the invention to provide a weighing mechanism which automatically makes a check weigh of all package weights, resulting in the goal signals referred to above, and automatically adjust the scale beam provisions to bring the weighed product toward an ideal goal weight in subsequent weighing cycles.

In further accordance with the present invention, the operation of zeroing the scale beam, upon automatically relieving the same of its master weight, is performed in a much simpler way than by a motor-operated shifting of a zeroing weight, as in our earlier application. In the improved machine a bias on the scale beam exerted by a simple tension spring is automatically altered at the zeroing phase, thus to compensate for a change in the weight of the weighing receptacle proper, due to adherence of coating or the like to the latter, or to compensate for changes in tension of other springs associated with the beam as the result of aging or temperature change, or to compensate out other variables, such as contact conductivity, and the like.

Further in accordance with the invention, the final discharge of the weighed product is made solely by resuming the vibration of the weighing receptacle, after being idle during the check weigh phase, at a vibratory amplitude substantially higher than any obtaining in the dribble feed-off phase, with the result that the material discharges rapidly, without the need for otherwise mechanically controlling the discharge operation. Here again, a great increase in simplicity and compactness of structure is the result.

Generally, it is an object of the present invention to provide weighing apparatus having the foregoing and other advantages over that of the prior application, and certainly over that of any previous weighers of which we are aware. Moreover, the equipment is such that it handles and accurately weighs materials of a wide variety of types, such as frozen or wet pack vegetables having adhesive films of water, syrup or vegetable juices which will not in many cases be self releasing from a tipped receptacle by gravity, even if turned upside down, and dry products of many kinds whether coated or not with adherent substance, etc.

By reason of structural features and relationships eliminating the need for discharge funnel means, the improved equipment avoids the possibility of clogging at discharge, of damage to frangible materials in a mass drop discharge, as well as the problem of flare-up of finely ground or powdery materials, etc. By contrast, there is a relatively progressive, though rapid, vibratory discharge of the weighed material, and the distance through which the material falls to the receiving carton is greatly shortened, as compared with previous weighers.

As is evident, the invention deals partly with improved methods underlying the operation of various units of the apparatus mentioned above, by which the latter is rendered much improved in performance over prior weighers known to the art.

The foregoing as well as other objects will become more apparent as this description proceeds, especially when considered in connection with the accompanying drawings illustrating the invention, wherein:

FIGS. 1 and 2 are fragmentary perspective views illustrating the general organization of the weighing equipment according to the invention, these views also showing certain associated material supply and return elevator units;

FIG. 3 is a fragmentary perspective view showing commutation and wiring provisions of the equipment, and the relationship they bear to vibratory receptacle weigher heads of the rotary weighing mechanism proper of the equipment;

FIG. 4 is a fragmentary view in larger scale than FIGS. 1 and 2, illustrating a star wheel carton feed control mechanism as operated in conjunction with the weighing apparatus to govern the feed of set-up cartons into the latter, particularly in response to overweight or underweight signals;

FIG. 5 is a fragmentary perspective view showing an opposite side of the weighing machine from FIG. 4, from which weighed and filled cartons issue for further closing treatment;

FIG. 6 is a fragmentary perspective view comprehensively showing the weighing machine and associated carton supply and material supply and material return elevator units;

FIG. 7 is a fragmentary top plan view, partially broken away, illustrating basic components of the equipment of FIG. 6;

FIG. 8 is a fragmentary view, partially broken away, in vertical axial section through the rotary table of the weighing mechanism proper of the equipment, also showing basic operating components;

FIG. 9 is a fragmentary top plan view illustrating the general arrangement of rotary and vibratory weighing pan devices of the weigher;

FIG. 9A is a view in transverse vertical section on line 9A—9A of FIG. 9, better showing the lateral overlapping of the circumferentially successive pan devices;

Figure 17:
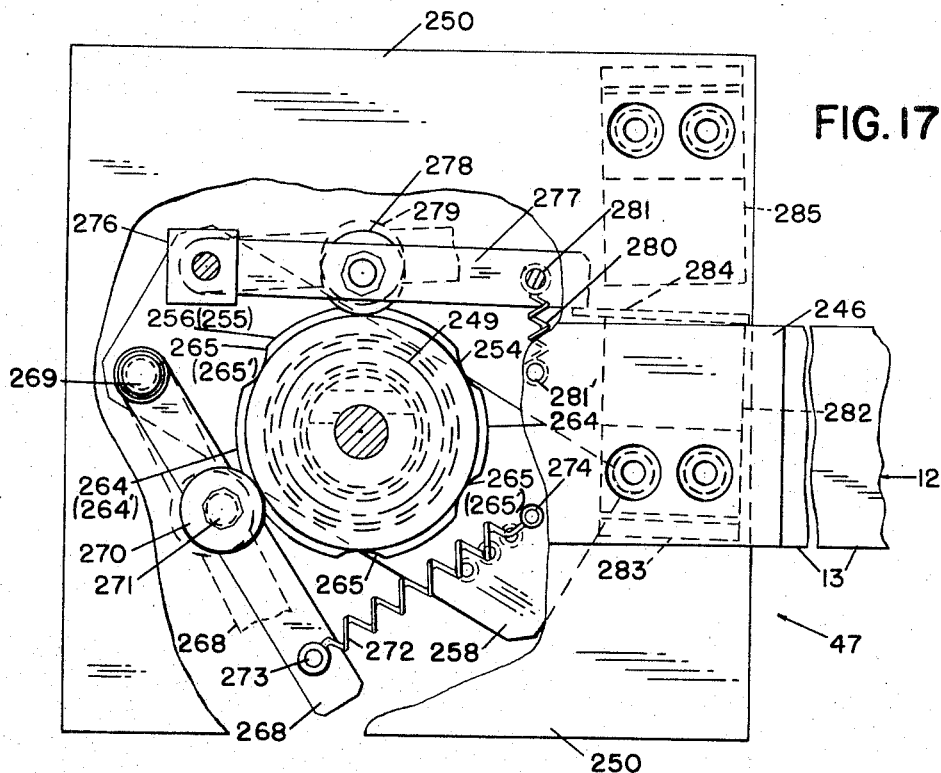
Figure 20:
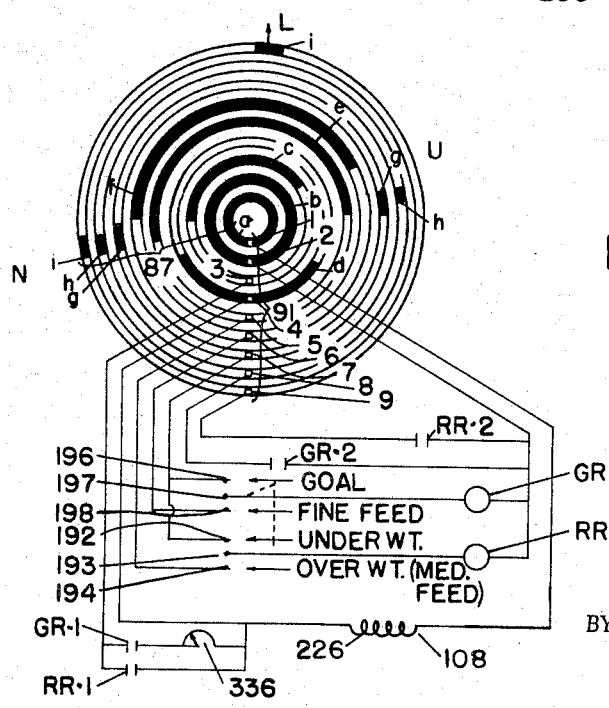

FIG. 10 is a larger scale view showing one of the multiple weighing units of the weigher, including a weigher head, an electromagnetically operated vibratory device on the head, and a weighing receptacle or pan vibrated by the device, this view being in vertical and radial section through the weigher head immediately inside of a side wall of the latter, so as to illustrate internal scale beam provisions of the head;

FIG. 11 is a fragmentary view in horizontal section along line 11—11 of FIG. 10;

FIG. 12 is a fragmentary view in vertical section along line 12—12 of FIG. 11;

FIG. 13 is a view in transverse vertical section on line 13—13 of FIG. 10;

FIG. 14 is a schematic view illustrating the relationships of certain contact provisions appearing in FIG. 13, as they occur in various phases of the weighing cycle;

FIG. 15 is a fragmentary top plan view showing frame structure of the invention, and certain fixed carton guide rail components associated therewith, also indicating the relationship thereto of a star wheel control unit, as well as a rail vibrating mechanism;

FIG. 16 is a fragmentary elevational view showing the star wheel carton control unit referred to;

FIG. 17 is a top plan view, partially broken away and in section along line 17—17 of FIG. 16, further illustrating the construction of the star wheel control unit;

FIG. 18 is a fragmentary top plan view, partially broken away, illustrating in larger scale features of the carton supply and star wheel control units which appear in FIG. 7;

FIG. 19 is a schematic view illustrating typical phases in the operation of the improved weighing equipment; and FIG. 20 is a schematic wiring diagram serving to illustrate the phasing of the apparatus in respect to its commutation means.

Machine in general

The operating instrumentalities of the improved weighing apparatus (designated in its entirety by the reference numeral 10) which perform the actual weighing of the discrete material or product, its discharge into set-up cartons, if at proper weight, and the production of various signals controlling these and other functions, are mounted upon a welded-steel base frame structure 12, wihch comprises an arrangement of horizontal steel channel and associated rigid frame members 13 (FIGS. 4, 5 and 8) surrounded by and welded at their ends to a surrounding polygonal welded bottom girdle 15. To such a frame structure 12 a number of vertically adjustable floor legs 16 (FIGS. 6 and 8) are welded at appropriate points to support the operating parts of the equipment with a balanced distribution of the latter's weight.

At certain of the corners thereof, the polygonal girdle 15 of the frame structure has vertically elongated posts 18, 19, 20 rigidly secured thereto; and these posts in turn have welded or otherwise rigidly secured thereto a pair of vertically spaced, parallel and coaxial steel rings 22, 23 of an open-toppled cylindrical weigher housing, generally designated 24, the sheet metal wall 25 of which is rigidly secured at its bottom and top, respectively, to the inner side of rings 22, 23.

The frame structure 12 may be provided with a number of casters 26 (FIGS. 8 and 15) which upon an adjustment to shorten the height of the length of the floor legs 16, will afford a mobile mount for the apparatus. The posts 18, 19, 20 and the frane structure 12 as a whole, rigidly support certain further mounting bracket means for operating components of the equipment, to be hereinafter described. Needed service provisions in the form of electrical connectors 28, shown as communicating with a wiring manifold or conduit 29, are also supported by frame 12 and housing 25, such provisions not being particularly germane to the invention.

The main components of the rotary weighing apparatus 30 proper of the equipment 10 generally comprise, as best shown in FIGS. 7, 8 and 9, a horizontal table 32 of circular outline, which may be a skeleton-like casting having a number of radially outwardly extending spokes 33 in equal circumferential spacing to one another, being reinforced by concentric rings 34, thus to sustain a suitable number of individual, equally spaced and outwardly radiating vibratory weighing units, each generally designated by the reference numeral 35 and hereinafter described in detail. Typically, there may be as many as 24 of such individual weighing units.

The supporting frame structure 12 mounts, directly beneath the rotary table 32, as best shown in FIG. 8, an electromagnetic zeroing unit 36, high goal and low goal weight units 38, 39, respectively, a main electrical drive motor 40, and a reduction gear 41, with operating chain and belt means, as later described. The frame structure 12 also sustains various other components of the weigher 30 which will also be hereinafter detailed, including an arcuate carton supporting and guiding rail structure 42 (FIG. 15) and a motor driven unit 43 for vibrating the latter to assist in settling the contents discharged to cartons C guided by rail structure 42.

Other basic components of the weighing equipment 10, appearing in FIGS. 1, 2, 4, 6, 7 and 18, are a carton supply mechanism 45 and an associated star wheel type carton control and indexing unit 47 supported by the frame structure 12 of the equipment, the star wheel unit 47 (as best shown in FIGS. 16 and 17 and hereinafter described in detail) serving to interrupt the feed of cartons C for the reception of a weighed charge in the event that the latter is signaled to be overweight or underweight.

A still further supply component coacting with the weigher 30 proper as actually operated (FIGS. 1, 2 6 and 7) is a three-stage material supply unit 48, appropriately supported by bracket means 49 on top of the fixed wall structure 24, the unit 48 being similar to the one illustrated and described in the Patent No. 3,156,311, identified above; which mechanism 48 is in turn supplied with material to be weighed, for re-distribution to the weighing units, by a return material feed elevator 50 delivering upwardly to a hopper 51 of supply unit 48, also as shown and described in Letters Patent No. 3,156,311 identified above. These units 48 and 50 are service components necessary to the operation of the improved weighing equipment of the invention, as is also a filled carton discharge unit or mechanism 52, but none of these last named three units constitute part of the actual invention.

*Rotary table*

For the support of the rotary spoke table 32, as shown best in FIG. 8, a central upright cylindrical mounting housing 53 is disposed fixedly and coaxially of the table, this housing having appropriate horizontal flanging 54 resting upon a pair of the horizontal frame members 13, with a gasket 55 interposed. An upright tubular rotary column 56 extends coaxially through the housing 53, being journaled for rotation in the latter by upper and lower tapered bearings 57; and a hollow fixed conduit 59 extends in turn coaxially through the column 56.

Conduit 59 is adapted to receive wiring components, generally indicated in FIG. 8 as an electrical cable 60, to bring them upwardly to electrical connection with a commutation unit 61 (to be later referred to), the unit 61 including a commutator drum member 62 fixedly mounted atop the conduit 59. A horizontal arm 63 is fixedly applied to the bottom of conduit 59, extending laterally thereof and being slotted at its end to receive a fixed restraining dowel 64 which depends from frame structure 12, thus to restrain the conduit member against rotation.

The rotative tubular column 56 has a star wheel drive sprocket 66 fixedly mounted thereon adjacent the bottom thereof, about which sprocket one reach of a horizontal chain belt 67 is trained for the drive of the star wheel unit 47, as will be described. As shown in FIG. 7, the chain belt 67 is also trained about a take-up idler sprocket 68 in the horizontal plane of the sprocket 66, the sprocket 68 having suitable provisions (not shown) for an adjustment of the chain belt tension. The main drive motor 40 also has hand operated means 69 of a conventional sort for an adjustment thereof to control belt tension.

As shown in FIG. 8, drive motor 40 is equipped conventionally with a junction box 40' and has a pulley 70 secured to its output shaft 71, about which pulley a V-belt 72 extends. The belt 72 is trained about an input pulley 74 of the reduction gear device 41; and the vertical output shaft 75 of this reduction unit has a pair of larger and smaller diameter, lower and upper sprockets 76, 77, respectively, affixed thereto. A horizontal chain belt 78 is adapted to drivingly connect one of these (shown as the smaller diameter sprocket 77) with an upper sprocket 79 fixed on tubular column 56 above the cylindrical housing 53. In the alternative, the chain belt 78 may similarly connect the larger diameter reduction gear sprocket 76 with a sprocket 80 fixed on the column 56, thus affording two different, optional speeds of drive for column 56.

A belt pulley 82 may also be affixed to the tubular column beneath the mounting housing 53 for optional use in driving a box or carton turn-table (not shown), this provision constituting no part of the invention, however.

The frame structure 12, on the side of the upright axis of spoke-table 32 adjacent drive motor 40 (see FIGS. 8 and 15), also fixedly supports an upright bracket 84 upon which the electromagnetic zeroing unit 36 is mounted, while at the opposite side of the axis, the frame structure also rigidly supports another upright bracket 85, upon which the respective electromagnetic high goal and low goal units 38, 39 are fixedly mounted.

Frame structure 12 also supports (by suitable means, not shown) a fixed horizontal operating cam 86 appearing in FIGS. 7, 8, 10 and 15, by means of which a master weight (to be described) is periodically lifted off a weigher scale beam of each weigher unit 35 in a zeroing phase of operation.

Thus, employing flexible belt and chain driving arrangements as shown in FIGS. 7, 8 and 15, the main drive motor 40 provides a V-belt drive for the reduction gear unit 41, with a selective speed drive for spoke table 32, and also a synchronized, selective speed chain drive for the star wheel unit 47, as will be described.

As indicated above, the upper end of the fixed tubular conduit 59 has coaxially fixedly secured thereto the cylindrical commutator drum 62 of commutation unit 61, this drum carrying an upright series of axially spaced slip or commutator ring elements or segments, two out of nine of which are designated 87 in FIG. 8. Wiring components 88 of the electrical supply cable 60 are connected to these elements in a way shown in FIG. 20, to be described.

Directly beneath commutator drum 62, the rotary tubular column 56 has coaxially fixed to its top an electrical chassis and brush holder support plate 89, this plate supporting for rotation an upright bracket 90 mounting a vertically extending series of conventional electrical take-off brushes 91, which, as shown in FIG. 8, electrically engage the arcuate slip ring or commutator elements 87 on drum 62.

As depicted in FIG. 3, electrical wiring connectors 93 are brought out through plate 89 and are appropriately connected with various electrically operated components of each weigher unit 35 in a manner which will be obvious to one having ordinary skill in the art, upon an understanding of the intended mode of operation of the equipment. As supported by the bracket 90 of rotary plate 89 certain electrical control components, such as relays, rheostats, and the like, generally indicated at 94, 95 in FIG. 3, are appropriately wired to the brushes 91. The commutation unit as a whole is ordinarily encased in an appropriate protective cover 96 (FIGS. 1, 2, 4 and 6), which is removable for access.

The rotary spoke table 32 is fixedly provided about its outer periphery with an upright cylindrical wall or drum 98, as shown in FIGS. 8 and 15, to the outer side of which an annular series of box pushers 99 are fixedly secured, projecting radially outwardly of the wall 98 in an equal circumferential spacing of the pushers from one another. These pushers are in the horizontal plane of delivery of the carton supply unit or mechanism 45, and will be hereinafter referred to in connection with the description of the latter.

Spoke table 32 also has fixedly secured to the bottom thereof an annular horizontal plate 100; and the wall 98 and bottom plate 100, both rotating with table 32, coact with the fixed upright cylindrical wall 24, which is outwardly concentric with wall 98, in providing an arcuate receiver trough 101. This trough is adapted to receive weighed material in excess of the exact desired weight which is discharged by weighing units 35 in the dribble feed-off phase of the weighing cycle, as well as full charges of material determined to be underweight or unduly overweight during the check weigh phase, and for which a box is accordingly prevented from being fed to the weighing unit by the star wheel control unit 47. Such excess material is continuously led out of the receiving trough 101 constituted by walls 24, 98 and bottom plate 100, as by means of a suitable interceptor plow device 103 (FIG. 5), by which such material is directed through an opening in the fixed outer cylindrical wall member 25 to the return elevator or conveyor 50. This elevator returns all the excess material to the staged supply unit 48, for re-feed to the traveling weighing units 35, along with new make-up material to be weighed.

Weighing unit

Structural features of the weighing units 35, of which there are 24 mounted to extend radially upon the spoke table 32, in the relationship to other operating components as shown in FIGS. 1, 2, 7 and 9, are best illustrated in FIGS. 10 through 13 of the drawings. Each unit 35 comprises, in general, a scale beam type weighing head 106, upon which an electrically operated vibratory device 108 is mounted, the device 108 in turn supporting for vibration a material receiving receptacle 110 in the form of an elongated, horizontal pan or tray.

Each of these vibratory pans, as they extend radially of the table 32, has an upper, outwardly projecting side flange 111 on a side wall which slightly overlaps laterally over the adjacent side wall of the next receptacle, as best illustrated in FIGS. 3, 9 and 9A, so that the annular array of weighing receptacles, trays or pans 110 will intercept all of the material to be weighed which is gravitationally supplied thereto from above by the staged vibratory supply unit 48, as they travel beneath the latter.

The weigher head 106 of the weighing unit 35, as shown in FIGS. 10–13, comprises an elongated and well sealed housing 112 having parallel upright side walls 113, top and bottom members 114, 115, respectively, and front and rear walls 117, 118, respectively. An elongated scale beam 120 is pivotally mounted between the housing side walls 113, as by means of a fulcrum or pivot pin 122 approximately midway of the length of beam 120; and an upright bar or stem 123 is medially pivoted on the scale beam 120 somewhat to the left (FIG. 10) of beam pivot 122 by means of a pivot pin 125. Stem 123 has a sealed and guided vertical movement through the cover member 114 of head housing 112, as through an appropriate diaphragm member 126; and above this member the stem 123 is rigidly secured by nut means 127 to a rigid bottom cross member 128 of the vibratory device 108, which will be later described. The lower end of the stem 123 is pivotally mounted at 130 to one end of a horizontal link 131, the opposite end of which link is pivotally mounted by a pin 132 to one of the housing side walls 113.

Accordingly, as the weight of the receptacle or pan 110 and its content varies in the weighing procedure, the scale beam 120 will be guided in a vertical-like path, as the beam swings about its fulcrum pin 122, by what amounts to a parallelogram linkage, including parts of the stem 123 and the beam 120 itself, the link 131 and part of a housing side wall 113.

In the event relatively heavy weighing receptacles 110 are employed, the invention contemplates the optional use of a small counterpoise arm 134, which is pivotally mounted at 135 to one of the housing side walls 113, a free end of this arm being connected by a coil tension spring 136 to the lower end of the stem 123. The opposite end of counterpoise arm 134 bears upwardly against an adjustable set screw stop 137 threaded through the top housing member 144. Accordingly, the arm 134 and spring 136 may assume part of the weight of an unusually heavy receptacle 110; however, this feature is optional and may be omitted by simply disconnecting spring 136 and/or anchoring its lower end to the side wall 113.

As in the copending application identified above, a dashpot device 138 is employed to partially damp and smooth out vertical motions of the beam-carried stem 123, this device including a plunger 139 operating in a cylinder 140 of a block 141 fixedly depending from the bottom housing member 115, with the plunger connected by an eye 142′ on upright rod or pin 142 to the lower end extension 123′ of the stem 123. A coil spring 143 pulls the lower loop of eye 142′ firmly against the lower end extension 123′ to eliminate all lost motion at this connection. Cylinder 140 may be filled with dashpot liquid through a fitting 144 (FIG. 13).

Scale beam zeroing

The scale beam 120 is, as indicated in FIGS. 11 and 12, comprised of parallel elongated arms 145, 146 suitably secured in fixed relation to one another; and these arms are, adjacent the rear thereof, provided with transversely aligned V-shaped clefts or notches 147 for the support of a master weight 148. The master weight comprises disc means 149 removably mounted on a horizontal center pin 150, the ends of which normally rest in the bottoms of the notches 147. A single master weight disc may be employed, or a combination of such discs may be selected such that the overall weight thereof will exactly equal the desired ultimate weight of the content alone of the weighing pan or receptacle 110 divided by the lever ratio of the beam. Such weight may be accurately arrived at, considering that, for example, the distance from the axis of the master weight pin 150 as received in notches 147, to the pivot of beam 120 at 122, and the distance from the pivot 122 to the pivotal axis of stem 123 at its pivot pin 125, will bear some predetermined ratio, for example 3:1.

To permit access to the master weight 148, the upper member 114 of weigher head housing 112 has an opening in the rear thereof, which opening is normally tightly sealed by a hinged, gasketed closing plate 151 held downwardly by a manually releasable hasp device 152. See FIGS. 3 and 10.

As in the copending application identified above, the weighing machine 30 proper of the present invention performs the zeroing operation on beam 120 after discharge of the weighed content of each of its several weighing receptacles 110, in order to make any necessary adjustment to compensate for the weight of coating, grease or the like which may have adhered to the receptacle to an extent to significantly increase the weight of the latter as sensed by the beam 120. The adjustment may also be employed to zero out the effects of changes in spring tension as the result of aging or heat change, variations in the resistance of electrical contacts, etc., as described in the copending application. However, the provisions for this zeroing adjustment according to the present improvement are much simpler in nature than those of said application, though equally effective for the intended purposes.

To this end, the side walls 113 of the weighing head housing 112 have aligned horizontal holes therethrough in which a pivot pin 153 is journaled; and the parallel arms 145, 146 of scale beam 120 are provided with aligned openings 154, through which pivot pin 153 extends, which openings are of sufficient diameter to permit some slight degree of vertical swinging action of the beam, in the vertical plane of pin 153, in its weighing operation. Pin 153 extends outwardly of one of the side walls 113, being sealed by an O-ring 156 and clamp plate 157; and outwardly of this plate the pin 153 fixedly receives a depending, cam-operated crank arm or rod 158. This rod operates upon sliding engagement with a side face of the fixed cam 86, for a purpose to be described.

Intermediate the arms 145, 146 of the scale beam 120, the pivot pin 153 is provided with a flatted surface 160 against which a U-shaped yoke member 161 is fixedly secured by screws 161'. The arms of the yoke member 161 are, adjacent their outer free ends, provided with V-shaped notches 162 in horizontal alignment with one another, the apices of these notches 162 being in the same vertical plane as those of the notches 147 of the scale arms 145, 146, as shown in FIG. 12. An adjustably tensioned coil spring 164 acts between yoke 161 and the bottom housing member 115 to urge the pivot pin 153 clockwise, as viewed in FIGS. 10 and 12.

Thus, the yoke 161, pivot pin 153 to which it is fixedly secured and crank rod 158, also fixed to the pivot pin, constitute a bell crank, of which the cam-operated rod or crank arm 158 extends well beneath the weigher head housing 112, as indicated in FIGS. 8 and 10. A coil tension spring 163 connects one of the yoke screws 161' with an adjustable anchor pin 164 threaded in the bottom housing member 115, thus to urge the bell crank clockwise, as viewed in FIGS. 10 and 12, for engagement with cam 86.

In the zeroing phase of the operating cycle, the crank arm or rod 158 engages the fixed arcuate cam 86 shown in FIGS. 7, 8, 10 and 15, with the result that the bell crank referred to above is swung counterclockwise (FIGS. 8 and 10), thus upon engagement with the fixed cam 86 to lift master weight 148, as indicated in dotted lines in FIG. 10, in turn then freeing the scale beam 120 of a counterpoise weight exactly equal to the intended weight of the content of its receptacle or pan 110 divided by the lever ratio of the beam.

With the scale beam relieved of the weight of the master weight, it will fail to complete an electrical contact in the zeroing phase, in a manner to be described, in the event that its own weight is excessive due to accretion of material. This signal is employed to deenergize the zeroing electromagnet unit 36 for the resultant adjustment of a spring bias applied to beam 120, in a direction to offset the excess weight, by the means presently to be described. The same type of bias adjustment may be employed to compensate for effects of spring change, contact resistance, etc., as mentioned above.

As also indicated above, the zeroing phase of operation occurs shortly after the discharge of product from each weighing pan 110, but following a brief stabilizing period on which the scale beam is permitted to come to a non-vibratory rest.

In order to perform the zeroing compensation in question, a small horizontal lever 166 is pivoted at 167 (FIG. 10) on one of the side walls 113 of the weigher head housing 112, a shorter arm of this lever being upwardly connected by a coil spring 168 to one arm of scale beam 120. The opposite, longer arm of the lever 166 bears downwardly upon an adjusting screw 169 of a spring bias adjusting device 170. Screw 169 is fixedly and coaxially mounted to the upper end of a rotary stem 171 journaled in a tubular guide 172 fixed to and depending from the bottom of housing 112, the screw 169 threadedly engaging in the tubular member 172 adjacent the top of the latter. Stem 171 projects downwardly of the tubular guide 172 through a bottom packing 173 in the latter, and has fixed thereon a wheel 174 equipped with a frictional traction ring 175.

This wheel is, during the zeroing phase of operation, adapted to pass between two upright pins 177, 178 fixedly carried by the vibratory zeroing unit 36 depicted in FIGS. 8 and 10; and upon initiation of a signal during the zeroing phase which reflects a significant increase in the weight of the receptacle 110, as due to adhered material, pin 178 will be spring shifted laterally on deenergization of an electromagnet of unit 36 as will be later described, so as to be engaged by the traction ring 175 of wheel 174, thus occasioning an increment of rotation of stem 171 and the application of upward screw force to the end of lever 166 directly above the bias adjusting screw 170.

Assuming that the de-energization of zeroing electromagnet 36 is the result of pan or tray overweight, there occurs a slight counterclockwise swing of lever 166 about its pivot at 167, increasing slightly the bias of spring 168 exerted on scale beam 120 and thereby compensating for the error introduced into the balance of the beam due to accretion. Should a previous correction of this sort have been excessive, or in the event the tray has been cleaned out, pin 177 will be engaged by traction wheel 174 due to energization of the electromagnet of unit 36 with the result that stem 171 will be rotated in the opposite direction, an increment of rotation thus diminishing the bias exerted by spring 168 on scale beam 120. A continuous hunting action of this sort keeps the beam at all times in perfect balance, insofar as its trim-off pan or tray 110 alone is concerned.

Particular reference being had to FIG. 8, the zeroing electromagnet unit 36, as mounted by the upright bracket 84 on frame structure 12, comprises a rigid transverse bottom member or bar 180 fixed on the bracket 84, a rigid transverse upper member 181 to which the pins 177, 178 are fixedly secured, and a pair of straight leaf springs 182, 183 fixedly secured at their opposite ends to end offsets of the top and bottom members 181 and 180, respectively. An upright electromagnet 185 is mounted fixedly on the bottom member 180, with an air gap existing between the upper core end of electromagnet 185 and the upper transverse member 181, which thus serves as an armature adapted to be attracted downwardly upon energization of the electromagnet, in turn to produce a horizontal shift of the coupled pins 177, 178 on member 181 to the left (FIGS. 8 and 10). This results in engagement of traction wheel 174 with the pin 178, and in a slight rotation of the stem 171 in one direction, for a corrective biasing of the beam 120 by adjusting the tension of spring 168 in one sense. The leaf springs 182 normally bias the top cross member 181 in the opposite, rightward direction upon de-energization of the electromagnet 185 of zeroing unit 36, thus to produce an opposite rotation of stem 171 when its traction wheel 174 engages the other pin 177. A rigid stop bar 187 is secured to the bottom member of the zeroing electromagnet unit 36, projecting upwardly generally parallel to the leaf spring 183 and being adapted to limit movement of the upper armature member 181 away from electromagnet 185.

*Overweight-underweight rejection and goal compensation*

As previously stated, a signal initiated at the check weigh phase of operation of the machine, by making of electrical contacts in response to excessive swing of the scale beam 120, serves to reject the charge as being an impermissible underweight or an excessive degree of overweight. Similar signals detected at the check weigh phase also serve to produce a correction of the relationship of such electrical contact means to cause subsequent weighed charges to be nearer the ideal goal weight, that is having neither an excessively large margin of receptacle content weight above a theoretically perfect zero nor sufficiently low margin to normally fall underweight, resulting in the subsequent reject of this charge and the loss of package production. For this purpose, as best shown in FIGS. 10, 13 and 14, certain multiple contact provisions are made. Their electrical circuitry is shown in FIG. 20.

As viewed in FIG. 10, the arm 146 of the parallel-armed scale beam 120 terminates just to the left of the parallelogram rod or stem 123, but the other beam arm 145 has an extension 145' further to the left, and to one side of this arm extension 145' a mounting block 189 fixedly depends from the top member 114 of the weigher head housing 112. Two sets of electrically conductive contacts, three contacts in each set, are clamped in electrically insulated relation to one another onto the bottom of block 189. The contacts of each set are in vertical register with one another and the sets are in a laterally spaced and horizontally aligned relation of their three respective contacts to one another. Suitable washers 190 electrically insulate the contacts from one another as thus clamped.

As best illustrated in FIGS. 13 and 14, the contacts of one set, to the left in those figures, comprise an upper, underweight contact 192, an intermediate, beam-responsive contact 193 serving as an armature and a lower, overweight contact 194. The contacts of the second set comprise an upper, goal contact 196, an intermediate, beam-responsive armature contact 197 and a lower fine feed contact 198, the purposes of which contacts are hereinafter referred to.

These contacts are flexible ones, although the upper and lower contacts 192, 196 are vertically sustained in a way to appear; and they terminate, as gripped against mounting block 189, in terminals 200 to which are wired six electrical conductors 201 of the electrical cables 93 (FIGS. 3 and 10—one cable for each of the 24 weigher heads 106). The cable 93 is led into the weigher housing 112 through a mechanical connector 203 on bottom housing member 115; and three more of its conductors, designated 204, are soldered to three terminals 205 fixedly supported in the housing 112. The terminals 205 are electrically connected to the vibratory device 108 of the weigher unit 35 in a way to be described.

The intermediate, beam-operated armature contacts 193 and 197 are supplied with current through their respective wiring conductors or leads 201 and terminals 200. The upper left-hand (FIGS. 13 and 14), underweight contact 192 and lower left-hand, overweight contact 194 are electrically connected from their terminals 200 and leads 201 to the electrical reject circuitry of the equipment in such manner that if, at the check weigh phase, either of the contacts 192 or 194 completes a circuit upon engagement by the intermediate, beam-operated contact 193 a signal reflecting a totally unacceptable overweight or underweight will be initiated; and the effect is to cause the star wheel control unit 47 to prevent entry of a carton for filling by the content of a weigher pan 110.

Contact 194 when engaged by contact 193 after the receptacle loading phase, due to overweight, also causes a medium trim-off rate of weight correction. Similarly the lower right-hand, fine feed contact 198 is engaged by the descending beam-responsive contact 197 after the receptacle loading phase, causing a fine trim-off rate of weight correction to continue after the medium trim-off rate of weight correction has ended, and until the final desired weight is approached. The disengagement of contacts 198 and 197 will initiate a signal through relay means (FIG. 20) to stop vibration of the pan vibrator unit 108 when pan 110 reaches balance.

During the check weigh phase the upper right-hand, goal contact 196 will, upon engagement by the ascending beam-responsive contact 197 (indicating an undesirably low weight, though still within the acceptable lower underweight tolerance) will be energized to in turn, through suitable relay means (not shown), energize the low goal electromagnet unit to be later described.

Contacts 196 and 197 also make and break to initiate signals during the zeroing phase, consequent to which the tension of the beam biasing spring 168 may be adjusted as needed.

Referring to FIGS. 10 and 13, the two upper contacts 192, 196 for underweight and goal signaling, respectively have their motion limited from above by manually adjustable stops in the form of set screws 207, 208 threaded through top housing member 114; while the two lower contacts 194, 198, respectively, are sustained from beneath by automatically operated abutment screws 210, 211, respectively, the operation of which will presently be described.

The outer end of the scale beam arm extension 145' is provided on one side thereof with a nylon insulating block 213 which upwardly engages a set screw stop 214 threaded in housing member 114, thus to adjustably limit motion of the beam 120 in clockwise direction, as viewed in FIG. 10; and an operating foot 215 of L-shaped outline is secured to a rear surface of this block. The foot 215 is engageable from above with the outer ends of the intermediate contacts 193, 197 to operate the latter in response to swing of scale beam 120.

Directly beneath the beam extension block 213 a housing side wall 113 fixedly supports a further block 217, which block in turn has a set screw 218 threaded upwardly therethrough; and the screw 218 pilots a small coil spring 219 which acts upwardly on the beam-carried block 213 to adjustably limit motion of the beam 120 in counterclockwise direction (FIG. 10), the spring 219 cushioning the engagement of the beam with set screw 218.

Fixed block 217 also has fixedly mounted thereon a stiff and relatively wide, rearwardly extending flexible cantilever plate 220 in which are adjustably threaded the pair of upwardly extending set screw stops 210, 211 mentioned above, these stops engaging the bottoms of the lower, overweight and lower, fine feed contacts 194, 198, respectively.

As appears in FIG. 13 the spacing of the pairs of fixed (though adjustable) contacts 192, 194 from one another is, in any setting, greater than that of contacts 196, 198, so as to permit the scheme of operating sequence presently to be described.

The outer end of plate 220 is engaged from below by an adjusting screw of a device 221 identical to the spring bias adjusting device 170 of beam zeroing unit 36, previously described, hence parts of device 221 corresponding to those of the device 170 are designated by corresponding reference numerals, primed, and further description will be dispensed with.

The traction wheel 174' of the device 221 is adapted to be engaged from one horizontal side or the other by one or the other of a pair of upright pins 224, 223 fixedly carried by the respective high goal and low goal compensating electromagnet units 38, 39. These units are both identical to the zeroing unit 36, so that, again, corresponding parts are designated by corresponding reference numerals, primed. It will be noted that, since the units 38 and 39 are operated independently of one another, the pins 224, 223 are individually on the upper armature elements 181' of units 38, 39, rather than being coupled on a single armature element 181, as in the zeroing unit 36.

Of the three terminals 205 to which leads 204 of the electric cable 93 are connected (FIG. 10), two are electrically connected in a suitable way to coil terminals of a solenoid 226 of the pan vibrating unit 108, while the third terminal 205 protectively grounds to the housing structure of head 106.

To amplify somewhat in connection with the operation of the scale beam spring biasing unit 170, in the event of an accumulation of dust, grease and the like on pan 110, for the compensation of which unit 170 is intended, the goal contacts 196, 197 (FIG. 13) fail to close, with the result that a relay is de-energized; and the contacts of such relay are arranged so that this will in turn de-energize the zeroing electromagnet unit 36. As the result, the armature part 181 of unit 36 is electromagnetically released up and to the right (FIG. 8). This positions the left-hand upright pin 177 on the armature piece 181 for engagement by the zeroer's traction wheel 174, and consequently the bias adjusting lever 166 is swung counterclockwise (FIG. 10) about its pivot at 167, thus increasing slightly the tension on spring 168.

In the event that this adjustment turns out to be excessive (as tested in the next rotative cycle), a closing of the goal contacts 196, 197 will cause an opposite compensation to be made upon energization of zeroing electromagnet unit 36, accompanied by the movement of armature cross piece 181 down and to the left, FIG. 8. Thus the other upright pin 178 is shifted to the left, to be engaged by traction wheel 174, with a resultant slight reduction in the tension of spring 168 acting on scale beam 120. The hunting nature of the zeroing compensation has been mentioned above.

FIG. 13 of the drawings shows the sets of contacts 192, 193, 194, and 196, 197, 198 in a typical high goal adjustment position, in which all contacts are open. This is one of the positions depicted (position "C") in schematic FIG. 14.

The positional relationship "A" shown at the top of FIG. 14 reflects a condition in which the weighing pans 110, which have been oversupplied by the material supply unit 48, remain in a decreasingly overweight condition while being vibrated by their respective vibratory units 108 at a medium rate. The beam-responsive intermediate contacts 193 and 197 are in electrical engagement with the lower, overweight contact 194 and the lower, fine feed contact 198. As medium-rate trim-off of material from the pan 110 proceeds to a predetermined extent, the beam-responsive contact 193 departs upwardly (condition "B") from overweight contact 194, indicating that the weight of the receptacle content is acceptable, within the maximum desiredly permissible limit beneath which the content will still be boxed. Of course, should the contacts 193, 194 remain engaged until the check weigh phase is reached, an unacceptable overweight is indicated; and the star wheel box control unit 47 of FIGS. 16 and 17 will be activated, as mentioned above, to cause the overweight content to be ultimately discharged, but unboxed.

The other intermediate, beam-responsive contact 197, however, remains engaged with the lower, fine feed contact 198, as the result of which, through suitable relay means, the voltage supplied to pan vibratory unit 108 is dropped, thus occasioning a lower, fine feed rate of vibratory discharge from pan 110. This condition is represented at "B" in FIG. 14.

In the relationship indicated at "C" in FIG. 14 and in FIG. 13 a high goal weight check is indicated, with the beam-responsive contacts 193, 197 disengaged from all four of the contacts above and below them. This results in de-energization of relay means (FIG. 20) and the consequent completion of a circuit energizing the high goal unit 38 (FIGS. 8 and 10), drawing its pin 224 to the left into position for engagement with the traction wheel 174' of the goal adjusting device 221. This produces a rotation of the threaded stem 171' of that device in a direction to raise the stops 210, 211 on plate 220 which respectively support the overweight and fine feed contacts 194, 198 from beneath.

The result is that the fine rate of vibratory discharge while weighing will be continued until a tray content is a trifle lighter than in the previous cycle, so that the pan's content may be reduced a bit more in weight toward the desired goal.

In phase "D" (FIG. 14) the intermediate beam-responsive contact 197 upwardly engages the goal contact 196, indicating that a low goal weight is achieved, and completing a relay circuit which causes the low goal unit 39 to be energized. The upright pin 223 of the latter is shifted to the right (FIGS. 8 and 10) in position for engagement by the traction wheel 174' of weigher head 106. The result is that the threaded stem 171' is run downwardly (oppositely from the high goal adjustment), lowering plate 220 and the lower overweight and fine feed contacts 194, 198, respectively. Consequently, vibratory discharge while weighing will be interrupted when tray content is a trifle heavier so that subsequent charges will be increased a bit in weight toward the desired goal.

Contacts and control arrangements in this invention are so arranged that the ideal goal weight is achieved and indicated by beam-responsive contact 197 being in contact with goal contact 196 half the time in the hunting operation thereof.

Likewise, it will be noted that the same beam contact 197 which controls the goaling operation also controls the zeroing operation. Accordingly the likelihood of error is greatly diminished.

Finally, condition "E" of FIG. 14 may prevail after the vibratory weighing phase has come to an end and vibration of the tray 110 is terminated. If at this time the intermediate beam-responsive contact 193 engages upwardly with the underweight contact 192, an impermissible underweight of material in the pan 110 is indicated.

Accordingly, a signal is forwarded by relay means to the star wheel unit 47, with the result that the unit prevents the admission of a set-up carton C through the carton supply unit to the interior of the weigher mechanism 30 proper. Of course, if the intermediate contact 197 alone engages upwardly, the low goal condition of position "D" is reflected.

By the same token, and as described above, should the beam-responsive contact 193 be oppositely engaged downwardly with the lower, overweight contact 194, an economically impermissible weight of material would be indicated, and a signal will be passed to star wheel unit 47 to prevent the infeed of a carton, just as in the case of an impermissible underweight. In this connection, no goal adjustment is permitted to be made through the commutation arrangement if the pan content is either excessively overweight or underweight, the electrical circuitry being arranged to prevent it.

It is to be noted that the high goal and low goal contacts have a continuous hunting action on the units 38, 39 resembling that exerted on the zeroing unit 36.

Again referring to FIGS. 8 and 10, the bottom transverse member 128 of pan vibrating unit 108, to which member the stem 123 of parallel arm linkage of beam 120 is connected at 126, has upturned end offsets 228, 229, to which upwardly inclined leaf springs 230, 231 are respectively connected by bolts 232, and the upper ends of these springs are also bolt connected at 232' to end offsets 233 of an intermediate cross piece 234, upon which the electrical solenoid 226 is fixedly mounted. This solenoid is adapted to be energized, through the commutation means referred to above, under a one-half wave alternating current voltage.

Inclined uprights 236, 237 connect the intermediate cross member upwardly with an upper cross piece 238 constituting a solenoid armature, upon which the vibratory pan 110 is fixedly secured; and an air gap 239 exists between this armature member and the core of the pulse-energized solenoid 226. Thus upon energization of the latter, the pan 110 will be vibrated at a rate determined by the voltage applied to the solenoid. For the purpose of quickly dampening vibratory movement of the armature piece 238 when solenoid 226 is de-energized, an upright rubber strap 240 is fixedly secured to the lower, intermediate and upper cross members 128, 234 and 238 of vibratory unit 108, the member 240 directly and resiliently back stopping the spring 236.

While the design of the individual vibratory pans 110 is not of the essence of the invention, it is seen by reference to FIGS. 3, 9 and 9A that each is integrally formed out of sheet metal to provide a bottom part 242 from which side walls 243 diverge upwardly, adjacent walls overlapping laterally at the top thereof at the flange formations 111 previously mentioned, and the bottom part 242 being provided with an outwardly convergent trough formation 244 medially thereof. The side walls 243, as best shown in FIG. 9, project outwardly beyond the outer end of the bottom formation 242, thus laterally confining the flow of weighed material as it progressively trims off during weighing, and directing the weighed and discharged material into a carton C therebeneath.

Figure 1:
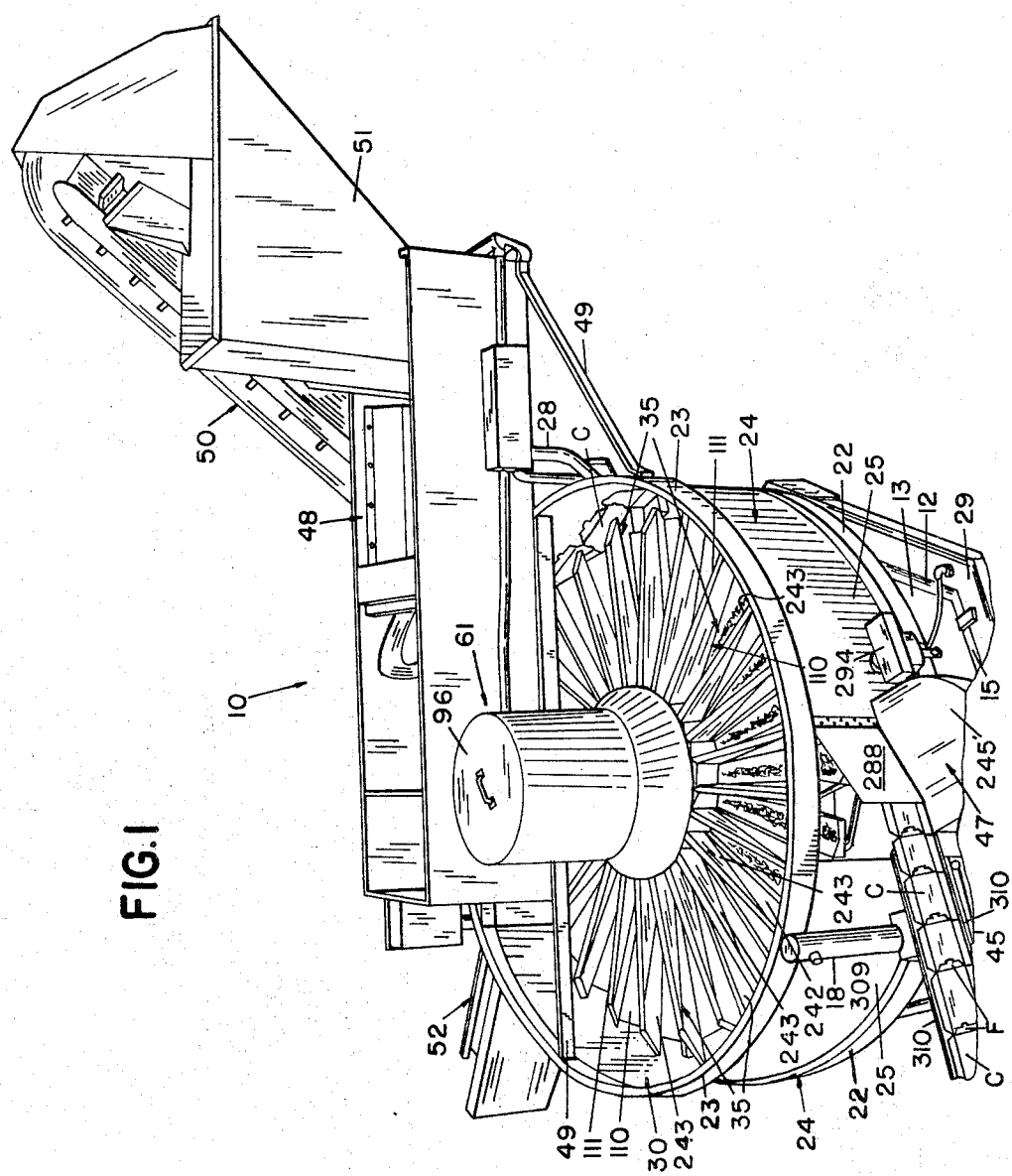

The relationship of the pans 110, in traveling beneath the three-stage vibratory material supply unit is, as shown in FIG. 1, such that the pans will receive excessive material in a zone toward the radial rear thereof, and the wall flange overlaps at 111 prevent waste of material in the initial discharge to the weighing pans or trays 110.

Following the check weigh stage in the operating cycle, the pans are vibrated at high amplitude under an increased voltage supply to their respective vibrator units 108, to such an extent that a very rapid discharge of their content is made, but nevertheless a smooth flow discharge, as distinguished from a sudden dump of a mass of product likely to damage a frangible material, or to cause a flare back of dust in the case of a powdery one.

If the armature contact 193 (FIGS. 13 and 14) is engaged with either of the underweight-overweight contacts 192, 194 in the check weigh phase, a set-up carton C is not present beneath the reject receptacle 110 to receive its content, such carton having been halted in response to an overweight or underweight reject signal from the contacts, and the signal being applied to the star wheel carton control mechanism 47 in the manner now to be described.

Star wheel carton control mechanism

The star wheel mechanism 47 proper, including a top star wheel member 245 normally enclosed in a fixed upper housing 245' and component brake and clutch control provisions thereof, enclosed in a lower fixed housing 245", see FIGS. 4, 16 and 17 of the drawings. Unit 47 is mounted basically by a horizontal bracket extension 246 supported adjacent the goal unit mounting bracket 85 by a member 13 of the frame structure 12 of the machine. A bracket 247 beneath housing 245' also serves to rigidly connect the unit to the ring 22 of mechanism 30. The star wheel 245 is centrally secured to the top of an upright drive shaft 248, which shaft journals in a vertically elongated bearing unit 249; and the bearing unit 249 is directly mounted to a horizontal rectangular support plate 250 secured to the bracket extension 246, the plate having a hole 251 through which the shaft 248 extends.

FIG. 16 illustrates in dot-dash outline an optional additional star wheel 245''' on its shaft for installations in which cartons of considerable depth are handled; and in this event (as shown in dot-dash line in FIG. 8) the usual ararngement of spoke wheel wall 98, plate 100 and frame wall 24 is replaced to correspondingly accommodate deeper cartons.

Beneath a lower bearing member 253 of the bearing unit 249 for the star wheel shaft 248, the latter has fixedly mounted thereon a combined clutch and brake device, generally designated 254, which includes a lower cam-like clutch disc or member 255, a like upper brake disc or member 256, and a hub 257 coaxially connecting these members rigidly to one another, the hub being sleeved on star wheel shaft 248 and in turn fixedly connected in driving relation to the latter.

Somewhat beneath the clutch disc 255 a rather large horizontal driving plate 258 of rectangular outline is provided, this plate having a central hole 259 through which the shaft 248 vertically extends, thus mounting the drive plate 258 in relatively rotative relation to the shaft. A sprocket 260 has an enlarged hub 261 similarly surrounding the shaft 248 and concentrically welded to the bottom side of drive plate 258; and a retainer collar 262 fixed on the bottom of shaft 248 sustains the drive plate and sprocket 260 from beneath. Sprocket 260 is driven, as indicated above, by the chain belt 67 from the sprocket 66 of the weigher apparatus 30 proper.

The respective clutch and brake discs 255, 256 of the device 254 are identical in their generally circular outline. The upper brake disc 255 has its arcuate outer periphery at 264 interrupted by six arcuately concave recesses or notches 265 in equal circumferential spacing to one another. Corresponding formations on the lower clutch disc 255 are designated by corresponding reference numerals, primed, and as is indicated in FIGS. 16 and 17, the two members 255, 256 are in angular register with one another, the recesses or notches 265 of the upper brake member 256 being vertically aligned with the recesses or notches 265' of the lower clutch member.

A driving clutch arm 268 is pivotally mounted on the clutch drive plate 258 by means of an upright pin 269 adjacent a corner of the latter, and the arm 268 is provided with a follower-type of disc drive roller 270, which is pivoted on an upright axis medially of the length of the arm by means of a further pin 271. Roller 270 is urged into engagement with the clutch disc 255 by means of a medium tension coil spring 272 acting between upright anchor pins 273 and 274, the former carried at the free end of arm 268 and the latter fixed on the drive plate 258.

Accordingly, upon rotation of the star wheel shaft 248 by sprocket 260 the clutch driving roller 270 is resiliently urged against the periphery of clutch disc member 255 under the bias of the medium tension spring 272, which exerts a force sufficient, when roller 270 engages in a disc recess 265', to normally rotate the clutch disc and the shaft 248 to which it is secured, for the continuous rotation of the star wheel 247 atop the shaft. However, this rotation is adapted to be halted in response to an overweight or underweight check weigh signal orignated in the contacts 192, 193, 194 (FIGS. 13, 14), by means of the braking provisions of the star wheel unit 47.

To this end, the horizontal mounting plate 250 is provided with a depending pin 275 extending through a spacing collar 276, the pin serving as a pivot for a horizontally extending brake arm 277, which is supported on the pin 275 from beneath by means of a spacer 277' sustained by the pivot pin. Medially of the length thereof, the brake arm 277 has a follower-like brake roller 278 journaled thereon by an upright pin 279, and a light tension coil spring 280 (FIG. 17) acts between an upright anchor pin 281 adjacent the end of the arm and a fixed anchor pin 281' depending from the support plate 250. The tension of spring 280, as compared with spring 272, is sufficient only to initiate movement (clockwise about pivot pin 275, as viewed in FIG. 17) of the brake arm 277 toward the brake disc 256 when an overweight or underweight reject signal is originated. Full braking force is exerted in a way to be described.

A reject signal originated at the overweight-underweight contacts has the effect of energizing a braking electromagnet 282 fixedly carried in depending relation to the mounting plate 250, as by means of a sub-bracket 283. Brake arm 277 is provided at its free end with an outwardly extending armature piece 284 which, upon energization of electromagnet 282, is drawn toward the latter, swinging the brake arm roller 278 into engagement with a notch or recess 265 in the cam-like brake disc member 256.

This action is performed under strong electromagnetic attraction to hold brake roller 278 in a brake disc recess, with the result that rotation of disc 256, the shaft 248 and star wheel 245 are instantaneously halted and held halted so long as the reject signal is applied to electromagnet 282. As indicated above, it is the sole function of the light tension spring 280 to start movement of the brake arm 277 toward disc 256, and away from a holding electromagnet 285.

Inasmuch as the brake roller 278 would normally ride the periphery of the brake disc 256 while electromagnet 282 remains de-energized, clicking into and out of brake recesses 265 with undesirable noise and wear, the control structure for the star wheel 245 includes the second or holding electromagnet 285 (FIG. 17) fixedly depending from mounting plate 250 in laterally spaced relation to magnet 282. Electromagnet 285 becomes energized when the electromagnet 282 is de-energized, thereby attracting brake arm armature 284 and holding the brake roller 278 away from the rotating brake disc member 256, as indicated in dotted line in FIG. 17.

The clutch arm's roller 270 will, as indicated above, have driving engagement in a recess 265 of clutch disc 255 under the bias of spring 272 in the normal operation of star wheel unit 47, but in the brief interval when the brake is applied the spring 272 will permit roller 270 to ride outwardly to the dotted line position of FIG. 17 as the brake roller 278 goes to its braking position, shown in solid line in FIG. 17; and the star wheel 245 remains halted despite the fact that the drive of its sprocket 260 continues.

As best indicated in FIGS. 4, 8, 15 and 18, the star wheel has six equally spaced radiating points 286 which operate (FIG. 8), in the horizontal plane of travel of cartons C delivered thereto by the carton supply unit 45. This takes place in a zone at which the carton guide structure 42 commences and at which the cylindrical upright member 25 of the fixed confining wall 24 of the weighing mechanism 30 is provided with an outwardly flared extension 288 of the wall member 25, by which the cartons C are partially guided into the weigher.

Each of the star wheel points 286 coacts with a succeeding one in providing a carton stop wall or face 289 against which a carton comes to a halt upon a reject signal, and a substantially 90° pusher face 290, which assists in continuing movement of the carton into the weigher in the absence of a reject signal.

Carton guide and pusher structure

Referring to FIGS. 8 and 15 of the drawings, the arcuate carton guide structure 42 comprises a pair of radially spaced, concentrically arcuate carton supporting rails 292, which are fixedly but resiliently mounted adjacent the top of the receiving space 101, at one of the arcuate ends thereof and near star wheel unit 47, by means of a horizontal bracket arm 293 extending through the wall member, an upright bracket arm 293' secured to the bottom wall ring 22, and a resiliently cushioned block device 294 secured between the arms 293, 293', as also shown in FIGS. 4 and 6. The rails 292 extend, in the circumferential direction, from the zone of entry of set-up cartons C past guide plate 288 into the weigher 30 to a zone adjacent their point of discharge just beyond the plow device 103, as shown in FIGS. 5 and 7. Intermediate their length, the motor operated vibratory unit 43 (hereinafter described) acts from beneath on the carton rails 292 to vibrate the same and compact the weighed content in the cartons C prior to discharge; and the rails have further intermediate frame support by a cushioned mount 294' (FIG. 15) similar to that at 294.

The rotary upright wall 98 of the spoke wheel 32 has fixedly mounted thereon, in equally closely spaced relation about its periphery, a succession of the carton pushers 99, which are in a horizontal plane directly above the carton rails 292, as illustrated in FIG. 8. These pushers are individually located directly beneath the outer ends of the vibratory pans 110, respectively, so that cartons C pushed thereby are accurately positioned to receive charges of material weighed and found to be within permissible weight limits. The shape of the pushers 99, which are preferably welded to the wall 98, is of no particular significance, so long as the pusher affords a rear pusher arm 295 (FIG. 15) and an intermediate member 296 serving to limit radial motion of the carton C and maintain the same properly above the rails 292. No attempt has been made in FIG. 15 to illustrate the exact spacings of the pushers 99.

The rail vibrating unit 43 is best illustrated in FIG. 15 of the drawings. Although its details constitute no part of the invention, it is typically shown in FIGS. 6 and 15 as being fixedly supported on the upright frame post 20, intermediate the arcuate extent of rails 292. This may be done by means providing a fixed table 298 upon which an electric motor 299 is fixedly mounted, being appropriately powered for continuous operation during the operation of the weigher. An output shaft 300 of motor 299 extends through appropriate flexible drive coupling means 301 through the fixed cylindrical wall 24 of the machine and into a frame 303 on which the rails 292 are secured from above.

Eccentric weights 304, 305 are fixedly carried on the motor shaft 300 within the confines of the frame 303, out of position for interference with the rails 292, and upon operation of motor 299 the eccentrics operate to vibrate rails 292 at high frequency, thus to compact the carton content and to insure against spillage thereof in transit to the plow discharge zone shown in FIG. 5. Here excess dribble fed-off or reject weighed material is directed to the return elevator 50 and carried thereby up to the staged vibratory material supply unit 48, where it may be joined by fresh material to be weighed.

Carton supply unit

Structural features of the carton supply mechanism or unit 45 are best shown in FIGS. 7 and 18 of the drawings, reference being also had to FIG. 6. Insofar as the present invention is concerned, the basic features of the unit 45 contribute to a controlled advance of the set-up cartons C into an end-to-end lineup in advance of the star wheel unit 47, with the laterally extended cover flaps F of the cartons (FIGS. 1, 2, 4, 6 and 18) overlapped in relation to one another, so that in the absence of a reject signal the cartons will be uninterruptedly advanced into the weigher structure in accurately timed relation to the travel of the carton pushers, under the control of star wheel unit 47. Accordingly, only structural members and relationships which contribute to this result will be detailed.

However, generally considered, reference being had to FIGS. 2, 4 and 6 in conjunction with FIGS. 7 and 18, the carton supply unit 45 is shown as comprising an appropriate box-type frame 308 supported at its end adjacent star wheel unit 47 by means of a bracket 309 (FIGS. 1 and 2) from the frame post 18. Frame 308 supports elongated parallel restraining rods or rails 310 along both sides of the top thereof, between which the walls of the set-up cartons C are guided. At its opposite end remote from the star wheel unit 47 (FIG. 18), the carton supply frame 308 is sustained by an upright floor post 312. A pair of pulleys 313, 314 (FIG. 18) are fixed on a horizontal shaft 315 journaled in this end of the frame, the pulley 313 being of larger diameter than the pulley 314. Elongated parallel belts 316, 317 are trained about the respective pulleys 313, 314, for a purpose to be described. The opposite ends of the belts 316, 317 are trained about pulleys 318, 319 on a horizontal shaft journaled in that end of frame 308.

The upper reaches of the belts 316 pass over the upper horizontal wall of a vacuum manifold 320 on frame 308, and in both of the vacuum manifold's end zones the upper manifold has at least one series of longitudinally aligned orifices 324. Air is withdrawn from the vacuum manifold 320 by a vacuum blower 320' appropriately vacuum coupled at its inlet to the side of frame 308 and whose motor and blower base are attached thereon by a plate base extension therefrom.

Thus, as operated at uniform rotative speed, by means to be described, the different diameter pulleys 313 and 314 impart greater and lesser linear speed, respectively, to the parallel belts 316 and 317. With cartons initially held down against the belts by vacuum applied through the orifices 324 at the left of FIG. 18, the result is that the cartons C are tilted somewhat in the horizontal plane, so that in being advanced by the belts, their adjacent, laterally projecting flaps F come into overlapped relation to one another, as shown toward the right in FIG. 18. This positions the cartons is a desired, closely spaced end-to-end relation to one another as they accumulate before the star wheel 245 of carton control unit 47.

Also referring to FIG. 18 of the drawings, the belt and pulley drive shaft 315 of the carton supply unit 45 has a large diameter pulley 326 secured thereto at one side of the frame 308, a drive belt 327 being trained about this pulley, and a smaller diameter pulley 328 journaled intermediate the length of the frame, as appears in FIG. 7. A further, larger diameter pulley 329 rotating coaxially with sprocket 328 is drivingly connected by a belt 330 with a pulley 331 on the shaft of an electric drive motor 332 appropriately mounted on frame structure 308. Thus, the carton feed belts 316, 317 are driven at their differential speeds independent of driving connection with the weigher mechanism 30, but the infeed supply of cartons C is nevertheless accurately correlated by the star wheel unit 47.

Motor provisions of the carton supply unit 45 are energized through electrical conduit means 322 connected (FIG. 6) to a control console 333 of the unit.

The vacuum orifices 324 at the star wheel end of manifold 320 are for the purpose of holding the carton C snugly downwardly on the continually traveling belts 316, 317, during the time that carton infeed is checked by the star wheel 245 upon a reject signal from the control contacts 192, 193, 194, shown in FIGS. 13 and 14. Hence the carton directly held back by an edge surface 289 of a point 286 of the wheel will be advanced in a positive and controlled manner into the weigher 30 by the edge surface 290 of the next following point of star wheel 245, once the latter has been released for rotation.

*Operation*

The mechanical operation of the individual basic components of the equipment 10, including their responses in some cases to electrical energization, is believed to be readily understandable from the preceding captioned descriptions thereof. The overall operation of the equipment, particularly in regard to the sequencing of operation of its several vibratory solenoid and electromagnetic zeroing, goal, overweight-underweight and carton control components, can best be grasped by reference to schematic FIGS. 19 and 20, considered of course in conjunction with FIGS. 8, 10, 13, 14, 16 and 17 showing structural features.

FIG. 19 depicts in a general way the scheme of timing of the various operations, commencing for example with the initial reception of an overweight of product to be weighed from the multiple stage vibratory feed or supply unit 48 as the weighing pans or trays 110 pass beneath that unit.

Considering the path of rotation of receptacles to be counterclockwise in the sense of FIG. 19, the oversupply is received in the first approximately 25° of rotative travel, in which the master weight 148 is positioned on the rear of the scale beam 120 (solid line in FIG. 10). Vibratory feed-off or trim-off now ensues until proper weight is reached which normally occurs sometime during the next 150° of travel, during which vibration of the receptacle at a medium rate takes place only until a near correct weight is reached which normally occurs in about the first 40° of the trim-off phase. In the remainder of the 150° sector weight of product in the receptacle should, in being fed off at a fine trim rate, reach a permissible weight, neither impermissibly overweight or underweight, even if not precisely between desired high and low goals. It is to be understood, however, that such weight may be reached at any point of the feed-off operation. After a permissible weight is reached, the receptacle merely remains at rest without weight change until the end of the 150° sector.

Permissible weight is determined in a short check weigh phase amounting to about 15° of rotation, after vibration of the receptacle has ceased and it has stabilized; and goal weight adjustments for the next cycle are made at this time, if in order. As determined by the initiation or not of an excessively overweight or underweight signal, the carton or box indexing or control unit 47 then operates to prevent or permit the advance of a carton C into the weigher 30.

This takes in a phase of about 10°, whereupon the receptacle or tray 110 is vibrated at a full or forced discharge rate to dispose of its weighed content, during the latter part of which interval the master weight is mechanically lifted from scale beam 120 preparatory to the zeroing operation. Thet ray is then given about 20° of travel to dampen out and stabilize it, vibration-wise, after which the zeroing operation takes place for approximately 15°, followed by the repetition of the whole cycle. Reference may be made to FIG. 20 for a more complete description of the electrical control circuitry.

As fine rate of dribble trim-off of material from pan 110 proceeds, the beam-responsive contact 197 departs upwardly (condition "C") from fine feed contact 198, indicating that the weight of the receptacle content is near ideal. As a result, through suitable relay means, the electrical power to pan vibratory unit 108 is interrupted and weighing unit 35 is idle until it reaches the checkweigh zone due to rotation of the multiple heads 35 about their axis.

As vibration of pan 110 is damped to a stop, in a manner to be described, some additional product content will discharge from the pan. Also due to inherent inertia delays in the motion of scale beam 120 in response to weight conditions in the pan 110, actual contact separation of contacts 197 and 198 will not occur for a moment after the actual weight condition to effect this condition has occurred.

Also inherent delay in relay reaction time contributes to a delay in actual interruption of the dribble feed after a weight condition to cause it has occurred.

Consequently flow of product from the weighing tray in not actually stopped until the weight condition has actually dropped below that required to cause a stoppage of the trim off. The amount of trim off weight this actually will overshoot depends on many factors, including product size, shape, flow ability, individual piece weight, weight of charge, rate of trim off, vibration damping of the pan 110, dashpot dampening of the motion of scale beam 120, inertia of the scale beam and associated mechanism, spring rate of scale beam motion, inherent relay delay time and others.

Commercial weighers currently on the market compensate for the above and similar factors, by manually adjusting the scale mechanism trigger at some weight other than the actual weight desired. For example, on an add-on type of scale, in order to obtain a 12 ounce charge the scale may be deliberately set to trigger at 11¾ ounce with the expectation of an additional ¼ ounce being received by the scale before actual stoppage of the flow can result. Unfortunately variations in the many factors, contributing to this overshoot, are variable, especially those concerning the product itself. As a result the package output of weighers previously available had to be regularly monitored by an operator, often on a ten minute or less basis, and corresponding adjustment of the scale trigger weights made. The above method, although the best commercial answer previously available, requires the attention of an operator, and does not satisfactorily control the weights, since product flow variations are too rapid for occasional adjustment, such adjustments as the operator does make must, economically, be based on a very limited sampling of package weights, and human error is involved.

This invention, as previously described, provides continuous automatic monitoring of all package weights and means to automatically adjust the scale control contacts such that subsequent package weights will be continuously urged toward an ideal goal weight.

As schematically shown in FIG. 20 there are nine electrical contact brushes rotating with the vibratory weigher heads 112 to which they are respectively wired at 200 and 205 (FIGS. 10, 13 and 14). These brushes (numbered 91 as a group in FIG. 8) are individual and specifically designated in FIG. 20 alone by the reference numerals "1" through "9." In that progression the brushes respectively engage with nine commutator slip rings and segments which are specifically denoted "a" through "i" in FIG. 20, these elements corresponding to the commutation elements generally designated 87 in FIG. 8.

The only two circumferentially continuous slip rings "a" and "b" are connected to corresponding terminals of power sources of predetermined, differing voltages. Ring "a" is wired to a terminal of a 110 volt source which is adapted to be connected through a half wave rectifier (not shown) with the solenoid 226 of the feed-off or trim-off device 108.

Thus the source represented by slip ring "a" is adapted to supply a pulsatory voltage to vibrate the trays or pans 110. On the other hand the slip ring "b" is adapted to supply a relay voltage from a smaller source of, say, 24 volts rating.

The commutator segments "c" and "d" are connected to the opposite terminal of the 110 volt supply, opposite that of the ring "a"; and the segments "e," "f" and "g" are wired to the terminal of the 24 volt source opposite that of the ring "b." The commutator segments "h" and "i" are feed-out segments to certain relays other than those appearing in FIG. 20.

It should be borne in mind that the electrical elements actually appearing in the circuitry of FIG. 20 are those primarily concerned with the initiation and duration of electrical signals governing the vibration of the receptacles 110 in weighing and discharging phases of the cycle, the adjustment of beam 120 and its coacting contacts in zeroing and goal adjustment, the operation of unit 47 for box control and the like. Electrical and mechanical components which actually perform these last named operations appear in other figures, or their nature will be evident to those having ordinary skill in the art. They include the zeroing unit 36, the high goal and low goal units 38, 39 and the box or carton control unit 47, and their operation will be clear from the description of FIG. 20 to follow without detailed disclosure of well known connections beyond what is indicated in the other figures.

As shown in FIG. 20, the overweight-underweight armature contact 193 is wired through the coil of a first power relay, shown as a so-called "reject" relay RR; while the goal and fine feed armature contact 197 is similarly wired through a second, so-called "goal" relay GR; and the relays RR and GR are connected from a common terminal to the brush 2 riding the 24 volt relay power supply commutator ring "b." The lower fixed, overweight contact 194 (which also signals the commencement and termination of medium rate feed or trim-off, hence is so denoted in FIG. 20) is wired to the brush 5 which is adapted to electrically engage a commutator segment "e" which connects with the 24 volt source; while the lower fixed, fine feed contact 198 is wired to the brush 6 which is adapted to be electrically engaged by commutator segment "f" to connect to the 24 volt source. The upper fixed, underweight and goal contacts 192, 196, respectively, are electrically connected from a common terminal to the brush 7 riding the 24 volt commutator.

One terminal of the solenoid-driven tray vibrating unit 108 is direct-connected to the brush 1 bearing on the 110 volt supply commutator ring "a" and the other terminal of this vibrator has three parallel connections to the commutator structure. One of these connections is a direct one through a first normally open contactor RR–1 of reject relay RR to the brush 3 engageable with 110 volt commutator segment "c." Another of these connections is to the same brush 3, but through a rheostat 336 series-connected to a normally open contactor GR–1 of goal power relay GR. The third connection is from the left-hand terminal of solenoid vibrator unit 108 directly to the brush 4, which brush is electrically engageable with 110 volt commutator segments "d."

The remaining connections of the circuitry of FIG. 20 are connections from the 24 volt brush 2 to the feed-out brushes 8 and 9, for functions to be described. The former includes a second, normally open contactor GR–2 of goal relay GR to supply power to the output commutator segments "h"; and the latter includes a normally open contactor RR–2 of reject relay RR to supply power to the output commutator segment "i." The operation of all of these various relay control provisions will now be detailed, to the extent that is necessary to enable one having ordinary skill in the art to practice the invention.

To repeat, as the scale beam trays 110 pass beneath the product supply unit 48 they receive a discharge stream therefrom representing for each receptacle a rather substantial overweight charge of product to be weighed. Hence the scale beam in question is moved in a manner to move the center armature contacts 193, 197 downwardly (FIGS. 13, 14 and 20). They depart from engagement with the respective fixed contacts 192, 196 and engage the respective contacts 194 ad 198. This is the condition represented at "A" in FIG. 14.

As indicated above, the contacts 194 and 198 are so positioned that movement of scale beam 120 in response to an overweight tray 110 will first cause the fine feed-goal armature contact 197 to engage contact 198 (indicating merely a slightly overweight charge) and then to cause the other, overweight-underweight armature contact 193 to engage fixed contact 194, reflecting a greater and unacceptable overweight condition at the time of the initial overcharge. The closure of the contact 193 with contact 194 initiates a medium rate feed or trim-off at the commencement of the weighing phase.

The closure of the contacts 193, 194 and 197, 198 at least partially completes electrical circuits from the 24 v. and 110 v. power sources. Of these, one is represented by the 24 volt commutator ring "b," to which a terminal of the 24 volt source is wired, through the brush 2, the coil of the reject relay RR, the contacts 193, 194, the brush 5 and 24 volt return segment "e." Resultant energization of reject relay RR closes its contactor RR–1, completing a circuit from the 110 volt source which includes commutator ring "a," brush 1, solenoid 226, contactor RR–1 and brush 3 to 110 volt commutator segment "c."

This causes the solenoid 226 to intermittently attract its armature piece 238 against the opposition of the springs 236, 237 (FIG. 10); and the result is that the weighing tray 110 is caused to vibrate in a manner to trim off weighed product in a radially outward direction at a medium feed-off or trim-off rate.

As the tray's product content is thus trimmed off, the tray 110 rapidly reaches a condition (normally in the relatively short 40° phase of the 150° trim-off shown in FIG. 19) in which the product thereon is only slightly overweight. In this condition, shown at "B" in FIG. 14, the aramture contact 193 departs upwardly from overweight (medium feed) contact 194, with the result that reject relay RR is de-energized to open its contact RR–1. However, in this condition of slight overweight, the fixed contact 198 remains engaged by the beam-responsive goal armature contact 197, maintaining the energization of goal relay GR.

Thus, a further electrical circuit is preserved by contact 197, this circuit including the 24 volt relay commutator ring "b," brush 2, goal relay GR, contacts 197, 198, brush 6 and 24 volt commutator segment "f." The resultant closure of contactor GR–1 of goal relay GR cuts into the solenoid circuit of the adjustable rheostat 336, connecting these series components with the brush 3 engageable by 110 volt commutator segment "c." The introduction of the additional resistance at rheostat 336 results in the vibration of tray 110 being continued, but at a substantially reduced rate, for the fine feed-off or trim-off of product from the tray 110. This goes on until the tray content reaches a condition of high goal, but permissible, weight justifying boxing of the product.

At this time, the fine feed-goal armature contact 197 departs upwardly from contact 198, the condition depicted in FIG. 13 and at "C" in FIG. 14, neither of the armature contacts 193 and 197 being then closed against any other contact, i.e., a high goal weight condition. As the result, goal relay GR is de-energized, opening its contact GR–1, and as a further result de-energizing the solenoid tray vibrating unit 108. Vibration of the tray is now quickly damped to a halt by means of the rubber dampener 240 incorporated in the spring system of unit 108, as illustrated in FIG. 10.

However, a very small amount of product will continue to be trimmed off the tray 110 after the solenoid circuit is interrupted and as vibration stops. The amount thus trimmed off in the coasting of a tray to a stop, vibration-wise, may still represent a loss in weight sufficient to cause the fine feed-goal armature contact 197 to upwardly engage goal contact 196, this representing the reaching of a condition of low goal weight which is shown at "D" in FIG. 14. It may even happen in an extreme instance that the amount of product fed or trimmed off after de-energization of vibratory unit 110 may be sufficiently great to cause the other armature contact 193 to upwardly engage the fixed contact 192; and this represents an unacceptable underweight condition which is depicted at "E" in FIG. 14.

As mentioned above, the vibratory trimming action takes place directly after the tray leaves the product stream issuing from the multiple stage supply unit 48; and the initial, medium rate trim-off to a slightly overweight condition is arrived at relatively early in the rotative cycle, as at a commutator sector denoted "L" in FIG. 20. If at this time the medium trim-off phase is not yet completed, the reject relay RR will remain energized, with the result that an electrical circuit will be completed through the contactor RR–2 of relay RR, the brush 9 and feed-out commutator segment "i"; and as a result, acting through relay or like control means (not shown) of the material or product supply unit 48, the inflow rate of product from that unit will be reduced for subsequent receiving trays 110.

If, on the other hand, the medium trim-off cycle has been completed before the segment "i" at "L" is reached, reject relay RR is de-energized; and the circuitry through contactor RR–2 to adjust the feed supply will not be completed. As a result the control means of the unit (not shown) will reverse, and slightly increase the inflow product rate to subsequent receiving trays 110.

When trim-off vibration of the tray 110, medium and fine rate, is completed, the tray continues its rotative path in an idle or rest condition thereof up to engagement with a commutator segment "i" at a sector "N" just prior to signaling (if in order) to the carton control unit 47. Means comes into operation at sector "N" to check the final weight condition of the tray for impermissible overweight or underweight, and halting of the carton control unit 47 in the manner described in connection with FIGS. 16 and 17.

Thus, if at the check weight phase the underweight-overweight armature contact 193 is in engagement with either the contact 194 (indicating an overweight condition) or with the contact 192 (representing an underweight condition), as shown at "A" and "E" in FIG. 14, the reject relay RR is energized to complete an electrical circuit from the power source through relay contact RR–2, thence an armature segment "i" at sector "N." This completes relay or like circuitry (not shown) through the electromagnet 282 of carton control unit 47 (FIGS. 16 and 17). As the result, and as described in connection with those figures, the star wheel 245 of unit 47 is instantaneously braked to a halt, preventing the infeed of a carton C, so that none is present when the reject weight tray 110 comes to its discharge position. Accordingly, the reject weight drops to the bottom of the trough space 101 (FIG. 8) above which the cartons C ordinarily travel, and is swept off the bottom member or plate 100 of this space by the plow-like deflector 103 appearing in FIG. 5.

On the other hand, if underweight-overweight armature contact 193 does not engage either the contact 192 or 194 at the check weigh station (FIG. 13 and condition "C" of FIG. 14), an acceptable weight is indicated, so that a circuit is not completed through reject relay contactor RR–2 and the carton C is fed through star wheel unit 47 to receive the permissible discharge.

Reference has been made to condition "D" of FIG. 14, a low goal weight condition in which the fine feed-goal armature contact 197 upwardly engages the contact 196. Under this condition the goal relay GR is energized, completing a circuit through its contact GR–2 and brush 8 (FIG. 20) engaging a commutator output segment "h." Included in this circuit is the electromagnet 185' of the low goal unit 39 shown in FIG. 8. The result is that the pin 223 of this unit is shifted to the right for engagement by the traction wheel 174' of the weigher head 112 for the pan 110 in question. Through the agencies shown best in FIG. 10, the contacts 194 and 198, as carried by the flexible plate 220, are backed down through an increment of vertical distance such that subsequent charges will have further to coast in trimming down from a slightly overweight condition to a desired goal weight condition, thus reducing the possibility of falling below low goal weight.

On the other hand, if the goal and fine feed armature contact 197 is out of contact with contact 196 thereabove (high goal weight condition "C" of FIG. 14), goal relay GR is de-energized to open its contactor GR–2. The result is that the electromagnet 185' of the second, high goal unit 38 is energized by suitable connections known to those skilled in the art; and this causes the pin 224 of unit 38 to shift to the left (FIG. 8) for engagement by the traction wheel 174' of weigher head 106. Consequently the screw means shown in FIG. 10 is rotated in the opposite direction from the low goal situation, with the result that the contacts 194 and 198 on plate 220 are elevated, thus to increase the possibility of a trimming coast down to desired goal weight for subsequent charges of this particular tray unit.

Continued rotation of the tray 110 complets a circuit through the vibratory solenoid 226 of pan vibrating unit 108 including the brush 4 engageable with the 110 volt commutator segment "d," the brush 3 being electrically disengaged; and vibration of the scale tray 110 now takes place at a forced high rate to discharge its content, either to a carton or not, as on a reject signal.

Theoretically, the tray 110 should be in its original balanced condition at this time, but it may not be because of the deposition or leaving of residue in the tray. This effect is cumulative, and unless corrected may after the weighing of several charges result in the cartoning of illegal underweight charges.

Accordingly, upon a continued rotation of the tray toward and into a commutator sector "U," during which time the master weight 148 is mechanically removed from scale beam 120, and after transversing a stabilizing arc (FIG. 19), in the event residue of material has built up in the tray to an extent making it impossible for armature contact 197 to upwardly engage fixed contact 196, there results a deenergization of goal relay GR at the zeroing sector "U." The circuit from commutator 24 volt supply ring 2 is interrupted by reason of opening of contact GR-2 and through suitable further relay and like circuitry (not shown) the electromagnet 185 of zeroing unit 36 is de-energized. This causes (FIG. 8) the left-hand pin 177 of the unit 36 to move to the right under the bias of the leaf springs 182, 183, with the result that the traction wheel 174 of the weigher head 112 is rotated in a direction to increase the tension of the coil spring (FIG. 10), this imparting additional clockwise bias to scale beam 120 to compensate or zero-out the effect of the residue weight.

On the other hand, upon physical removal of such residue the armature contact 197 will upwardly engage the contact 196 in the next weighing cycle, and in the zeroing phase at "U" the electromagnet 185 of zeroing unit 36 will be energized, resulting in an opposite rotation of traction wheel 174, a relaxation of the tension of counterpoise spring 167, and a reduction of the bias on scale beam 120 in the clockwise direction (FIG. 10).

The master weight 148 is now mechanically replaced on the rear of the scale beam, and the tray 110 passes again under the product stream from multiple stage supply unit 48, for the commencement of a new filling, trimming and discharging cycle.

It is seen that the invention affords, in addition to a large number of specific improvements contributing to simplicity and low cost production without sacrifice of accuracy, a number of broad or basic improvements over the weigher apparatus of the copending application identified above. These are as follows:

(a) In addition to the vibratory operation of the traveling weighing receptacles to trim off excessive material or product initially supplied thereto, to approach or reject the desired final weight, a vibratory total discharge of product actually dischargeable from the receptacles, after a check weigh phase of operation;

(b) In addition to the initiation of an overweight or underweight reject signal during the check weigh phase, the initiation of a goal signal, as a result of which the scale beam contact system is adjusted to maintain acceptable and packageable product weights as close as is possible in practice to a theoretically perfect goal weight, i.e., within a narrowly limited, economically desirable goal range;

(c) The provision of an improved scale beam zeroing operation, following total product discharge, involving only an adjustment of spring bias exerted on the scale beam;

(d) The provision of an improved, star wheel-type of carton control operation, whereby an end-to-end series of cartons supplied to the fore is interrupted in its normal movement in response to the overweight or underweight reject signal; and (e) The provision of an improved carton supply unit to forward set-up cartons to the star wheel unit, involving a variable speed, dual belt feed-in of the cartons, and the application of vacuum to the latter, at least at the feed-in supply zone and the feed-out zone directly adjacent the star wheel unit, for the purpose of holding the cartons on the belts, and of skewing the cartons in travel, as they approach the feed-out zone, in a way to overlap the end flaps of the cartons and secure the desired end-to-end contacting engagement thereof.

In these important respects the method and apparatus of the present invention afford important refinements over the method and apparatus of the prior application, as well as, of course, over prior art weighing methods and apparatus.

What I claim as my invention is:

1. Apparatus for weighing materials, comprising a continuously traveling weigher head, a material receptacle, said weigher head having a scale beam supporting said receptacle, and means to operate the receptacle during a phase in the cycle of head travel to trim off therefrom an overweight of material, means to adjustably balance the scale beam, including a master weight carried by the scale beam and adapted to variably counterpoise the latter, and a spring biasing the scale beam, and means adapted to vary the bias of said spring on the beam, including electrical contact means having an armature contact moving in response to movement of said scale beam and a contact coacting with said armature contact and adapted to be engaged and disengaged by said armature contact to open and close said contact means, means to vary the counterpoise effect of said master weight on the beam in a phase of the head travel following said trim-off phase, and means operating not prior to said counterpoise varying phase and in response to opening and closing of said contact means to actuate said spring bias varying means to alter the bias of said spring.

2. An apparatus for weighing materials, comprising a continuously traveling weigher head, a vibratory material receiving receptacle, said weigher head having a scale beam supporting said receptacle, and means to vibrate the receptacle during a phase in the cycle of head travel to trim off therefrom only an overweight of material, an electrical armature contact moving in response to movement of said scale beam, and at least one coacting electrical contact adapted to be engaged and disengaged by said armature contact, the opening and closing of said armature and coacting contacts being governed in response to an overweight or underweight on said scale beam to initiate or not to initiate a reject signal, said receptacle being vibrated, after initiation or failure of initiation of said reject signal, to finally discharge the weighed content of the receptacle.

3. An apparatus for weighing materials, comprising a continuously traveling weigher head, a material receptacle, said weigher head having a scale beam supporting said receptacle, and means to operate the receptable during a phase in the cycle of head travel to trim off therefrom an overweight of material, an armature contact moving in response to movement of said scale beam, a contact coacting with said armature contact and adapted to be engaged and disengaged by the latter, said armature and coacting contacts being opened and closed in response to movement of said scale beam to initiate or not to initiate a signal, and means operating in response to said signal to maintain a limited goal weight range within a material overweight reject limit.

4. An apparatus for weighing materials, comprising a continuously traveling weigher head, a vibratory material receptacle, said weigher head having a scale beam supporting said receptacle, and means to vibrate the recptacle during a phase in the cycle of head travel to trim off therefrom an overweight of material, armature contacts moving in response to movement of said scale beam, contacts coacting with said armature contacts and adapted to be engaged and disengaged by the latter, said armature and coacting contacts including a pair opened and closed in response to an overweight or underweight on said scale beam to initiate a reject signal, said armature and coacting contacts also including a pair opened and closed in response to movement of said scale beam to initiate or not to initiate a further signal, and means operating in response to said further signal to maintain a limited goal weight range, between the range limits in which a reject signal is initiated, said receptacle being vibrated after initiation or failure of initiation of said reject signal to discharge the weighed content of the receptacle.

5. An apparatus for weighing materials, comprising a continuously travelng weigher head, a material receptacle, said weigher head having a scale beam supporting said receptacle, and means to operate the receptacle during a phase in the cycle of head travel to trim off therefrom an overweight of material, means to adjustably balance the scale beam including a master weight carried by the scale beam and adapted to variably counterpoise the latter, and a spring biasing the scale beam, and means adapted to vary the bias of said spring on the beam, including electrical contact means having armature contacts moving in response to movement of said scale beam, and contacts coacting with said armature contacts and adapted to be engaged and disengaged by the latter to open and close said contact means, means to vary the counterpoise effect of said master weight on the beam in a phase of the head travel following said trim-off phase, and means operating not prior to said counterpoise varying phase and in response to opening and closing of said contact means to actuate said spring bias varying means to alter the bias of said spring, said armature and coacting contacts including a pair opened and closed in response to movement of said scale beam to initiate a signal, and means operating in response to said signal to maintain a limited goal weight range within a material overweight reject limit.

6. An apparatus for weighing materials, comprising a continuously traveling weigher head, a vibratory material receiving receptacle, said weigher head having a scale beam supporting said receptacle, and means to vibrate the receptacle during a phase of the head travel to trim off therefrom an overweight of material, means to adjustably counterpoise the scale beam, electrical contact means including armature contacts moving in response to movement of said scale beam, and contacts adapted to be engaged and disengaged by said armature contacts to initiate electrical signals, means to periodically vary the effect of said counterpoise means on said scale beam in response to a signal initiated by one of said armature contacts, and means responsive to a further signal initiated by another of said armature contacts to maintain a limited goal weight range within a material overweight reject limit.

7. A weighing machine comprising a traveling support having a weigher head mounted thereon for travel therewith, a vibratory weighing receptacle carried by said head for travel therewith, and means to variably vibrate said receptacle to discharge material therefrom, including means controlling the rate of receptacle vibration for a relatively minor trim-off discharge of material during a material weighing phase and a total vibratory discharge following the weighing phase.

8. A weighing machine comprising a rotary support having a plurality of weigher heads mounted thereon for rotation therewith, a vibratory weighing receptacle carried by each head for rotation therewith, and means to variably vibrate said receptacles in the rotation thereof to discharge material therefrom, including means controlling the rate of receptacle vibration for a relatively minor trim-off discharge of material during a material weighing phase and a total vibratory discharge following the weighing phase.

9. A weighing machine comprising a rotary support having a plurality of weigher heads mounted thereon for rotation therewith, a vibratory weighing receptacle carried by each head for rotation therewith, each head including a counterpoised scale beam supporting the receptacle thereof for the weighing of the receptacle and its content of material during rotation, means to variably vibrate said receptacles in the rotation thereof to discharge material therefrom, including means controlling the rate of receptacle vibration for a relatively minor trim-off discharge of material during a material weighing phase and a total vibratory discharge following the weighing phase, means to alter the counterpoise on the beam of the empty receptacle of each weigher head after said total discharge by an amount reflecting a desired weight of the totally discharged material, and means to vary the counterpoise on the empty receptacle beam by a compensating amount reflecting the difference between said desired weight and the actual weight of the weighed content of the receptacle just prior to total discharge.

10. A weighing machine comprising a rotary support having a plurality of weigher heads mounted thereon for rotation therewith, a vibratory weighing receptacle carried by each head for rotation therewith, each head including a counterpoised scale beam supporting the receptacle thereof for the weighing of the receptacle and its content of material during rotation, means to variably vibrate said receptacles in the rotation thereof to discharge material therefrom, including means controlling the rate of receptacle vibration for a relatively minor trim-off discharge of material during a material weighing phase and a total vibratory discharge following the weighing phase, means to alter the counterpoise on the beam of the empty receptacle of each weigher head after said total discharge by an amount reflecting a desired weight of the totally discharged material, and means to vary the counterpoise on the empty receptacle beam by a compensating amount reflecting the difference between said desired weight and the actual weight of the weighed content of the receptacle just prior to total discharge, said counterpoise-varying means comprising a spring biasing the scale beam, and means to vary the tension of said spring.

11. A weighing machine comprising a traveling support having a weigher head mounted thereon for travel therewith, a weighing receptacle carried by said head for travel therewith, means to operate said receptacle in the travel thereof to discharge material therefrom, said weigher head having means responsive, in the event of an inacceptable weight of material on its receptacle, to originate a reject signal, and means responsive to an acceptable weight on its receptacle not occasioning a reject signal, to originate a different goal adjusting signal reflecting the nature of acceptability of the material weight.

12. A weighing machine comprising a rotary support having a plurality of weigher heads mounted thereon for rotation therewith, a vibratory weighing receptacle carried by each head for rotation therewith, means to vibrate said receptacles in the rotation thereof to discharge material therefrom, each weigher head having means responsive, in the event of an inacceptable weight of material on its receptacle, to originate a reject signal, and means responsive to an acceptable weight on its receptacle not occasioning a reject signal, to original a different goal adjusting signal reflecting the nature of acceptability of the material weight.

13. A weighing machine comprising a rotary support having a plurality of weigher heads mounted thereon for rotation therewith, a vibratory weighing receptacle carried by each head for rotation therewith, means to vibrate said receptacles in the rotation thereof to discharge material therefrom, including a relatively minor, trim-off discharge of material during a material weighing phase and a total discharge following the weighing phase, each weigher head having means responsive, in the event of an inacceptable weight of material on its receptacle, to originate a reject signal, and means responsive to an acceptable weight on its receptacle not occasioning a reject signal, to originate a different goal adjusting signal reflecting the nature of acceptability of the material weight.

14. A method of weighing materials, comprising supplying traveling weigher receptacle means with an excess weight of the material, operating the receptacle means during weighing of the material in travel to discharge therefrom material of excessive weight to reduce the receptacle means and its content toward or to an acceptable weight, checking the receptacle means after said operation, in an operation involving the sensing of an inacceptable overweight or underweight content, an operation of sensing a goal range between inacceptable overweight and underweight range limits, and the initiation and termination of control signals in consequence of said respective checking operations, and again operating the receptacle means to discharge the total dischargeable weighed content.

15. A method of weighing materials, comprising supplying traveling weigher receptacle means with an excess weight of the material, operating the receptacle means during weighing of the material in travel to discharge therefrom material of excessive weight to reduce the receptacle means and its content toward or to an acceptable weight, checking the receptacle means after said operation, in an operation involving the sensing of an inacceptable overweight or underweight content, an operation of sensing a goal range between inacceptable overweight and underweight range limits, and the initiation and termination of control signals in consequence of said respective checking operations, again operating the receptacle means to discharge the total dischargeable weighed content, and adjusting the weigher receptacle means in response to a signal reflecting said second named checking operation to return the acceptable weight of material weighed in said receptacle means in a later weighing cycle to within the limits of said goal range.

16. A method in accordance with claim 14, in which both operations of discharging the content from the receptacle means are performed by vibrating a part of the lattter.

17. A method in accordance with claim 15, in which both operations of discharging content from the receptacle means are performed by vibrating a part of the latter.

References Cited
UNITED STATES PATENTS
3,156,311  11/1964  Olofsson et al. _____ 177—55

RICHARD B. WILKINSON, *Primary Examiner.*

GEORGE H. MILLER, JR., *Assistant Examiner.*